United States Patent
Teyeb et al.

(10) Patent No.: US 12,108,321 B2
(45) Date of Patent: Oct. 1, 2024

(54) ENABLING UPLINK ROUTING THAT SUPPORTS MULTI-CONNECTIVITY IN INTEGRATED ACCESS BACK-HAUL NETWORKS

(71) Applicant: TELEFONAKTIEBOLAGET LM ERICSSON (PUBL), Stockholm (SE)

(72) Inventors: Oumer Teyeb, Montréal (CA); Gunnar Mildh, Sollentuna (SE); Ajmal Muhammad, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 346 days.

(21) Appl. No.: 17/608,280

(22) PCT Filed: May 1, 2020

(86) PCT No.: PCT/IB2020/054153
§ 371 (c)(1),
(2) Date: Nov. 2, 2021

(87) PCT Pub. No.: WO2020/222198
PCT Pub. Date: Nov. 5, 2020

(65) Prior Publication Data
US 2022/0217613 A1 Jul. 7, 2022

Related U.S. Application Data

(60) Provisional application No. 62/842,429, filed on May 2, 2019.

(51) Int. Cl.
*H04W 40/22* (2009.01)
*H04L 45/74* (2022.01)
*H04W 28/10* (2009.01)

(52) U.S. Cl.
CPC ............. *H04W 40/22* (2013.01); *H04L 45/74* (2013.01); *H04W 28/10* (2013.01)

(58) Field of Classification Search
CPC ..... H04W 40/22; H04W 28/10; H04W 28/08; H04L 45/74; H04L 47/125
See application file for complete search history.

(56) References Cited

U.S. PATENT DOCUMENTS

| 2012/0147783 A1 | 6/2012 | Shaffer et al. |
| 2013/0172000 A1 | 7/2013 | Van Phan et al. |
| 2019/0327660 A1* | 10/2019 | Hong .................... H04L 5/0048 |
| 2021/0051579 A1* | 2/2021 | Luo ........................ H04W 40/22 |

(Continued)

FOREIGN PATENT DOCUMENTS

WO 2011064038 A1 6/2011

OTHER PUBLICATIONS

Ericsson: "Backhaul Link Identifier for Packet Forwarding in IAB Networks". 3GPP TSG-RAN WG2 Meeting #105bis. R2-1903959. Xi'an, P.R. of China, Apr. 8-12, 2019.

(Continued)

*Primary Examiner* — Will W Lin
(74) *Attorney, Agent, or Firm* — Ericsson Inc.

(57) ABSTRACT

A method performed by a network node operating as an Integrated Access Backhaul (IAB) node includes determining at least two parent nodes within a multi-hop IAB network. The IAB node receives an uplink routing configuration associated with a cell group configuration that identifies a selected one of the parent nodes. Based on the uplink routing configuration associated with the cell group configuration, packets are sent to at least one of the at least two parent nodes.

22 Claims, 19 Drawing Sheets

(56) References Cited

U.S. PATENT DOCUMENTS

| | | | | |
|---|---|---|---|---|
| 2021/0243672 | A1* | 8/2021 | Deshmukh | H04W 28/0268 |
| 2021/0258244 | A1* | 8/2021 | Xu | H04L 45/28 |
| 2021/0266783 | A1* | 8/2021 | Zhu | H04W 72/1268 |
| 2021/0274404 | A1* | 9/2021 | Koziol | H04W 36/0055 |
| 2021/0378035 | A1* | 12/2021 | Zhu | H04W 36/0055 |
| 2022/0053588 | A1* | 2/2022 | Shaheen | H04W 76/19 |
| 2022/0141749 | A1* | 5/2022 | Luo | H04W 36/0055 370/331 |
| 2022/0141890 | A1* | 5/2022 | Miao | H04W 40/22 370/329 |

OTHER PUBLICATIONS

Ericsson: "Next hop Identifier for Packet Forwarding in IAB Networks". 3GPP TSG-RAN WG2 Meeting #106. R2-1907004. Reno, NV. May 13-17, 2019.

Ericsson: "Packet Forwarding in IAB Networks". 3GPP TSG RAN WG2 Meeting #105. R2-1901326. Athens, Greece. Feb. 25-Mar. 1, 2019.

Huawei, et al.: "RRC Signaling Structure for IAB". 3GPP TSG-RAN WG2 Meeting #105bis. R2-1904987 (Resubmission of R2-1902065). Xi'an, China. Apr. 8-12, 2019.

LG Electronics Inc.: Summary of ernail discussion [105#46] [IAB] Routing. 3GPP TSG-RAN WG2 #105-Bis, R2-1905063. XI0an, China, Apr. 8-12, 2019.

Mediatek: "Breakout Session Notes NRUP IAB IIOT NR-U". 3GPP TSG-RAN WG2 Meeting #105bis. R2-1905182. Xi'an, China, Apr. 8-Apr. 12, 2019.

3rd Generation Partnership Project; Technical Specification Group Radio Access Network; NG-RAN; Architecture description (Release 16) 3GPP TS 38.401 V16.0.0, Dec. 2019.

Qualcomm, New WID: Integrated Access and Backhaul for NR, RP-182882 (Revision of RP-182810), 3GPP TSG RAN Meeting #82, Sorrento, Italy, Dec. 10-13, 2018.

Qualcomm Incorporated (Rapporteur), Report from [105#45]: R2+R3 IAB miscellaneous, R2-1905207, 3GPP TSG-RAN WG2 Meeting #105bis, Xi'an, China, Apr. 8-12, 2019.

ZTE Corporation, et al., Consideration on Routing in IAB, R2-1904601, 3GPP TSG-RAN WG2 Meeting #105bis, Xi'an, China, Apr. 8-12, 2019.

Nokia, et al., Adaptation layer contents and configuration, R2-1902546, 3GPP TSG-RAN WG2 Meeting #105, Athens, Greece, Feb. 25-Mar. 1, 2019.

Huawei, Routing Table Design and Configuration, R3-191849, 3GPP TSG-RAN WG3 Meeting #103bis, Xi'an, China, Apr. 8-12, 2019.

* cited by examiner

ENABLING UPLINK ROUTING THAT SUPPORTS MULTI-CONNECTIVITY IN INTEGRATED ACCESS BACK-HAUL NETWORKS

This application is a 371 of International Application No. PCT/IB2020/054153, filed May 1, 2020, which claims the benefit of U.S. Application No. 62/842,429, filed May 2, 2019, the disclosures of which are fully incorporated herein by reference.

BACKGROUND

The Third Generation Partnership Project (3GPP) is currently standardizing integrated access and wireless access backhaul (IAB) in New Radio (NR) in Rel-16 (RP-RP-182882).

The usage of short range mmWave spectrum in New Radio (NR) creates a need for densified deployment with multi-hop backhauling. However, optical fiber to every base station will be too costly and sometimes not even possible (e.g. historical sites). The main Integrated Access Backhaul (IAB) principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) such as, for example, to residential/office buildings. The larger bandwidth available for NR in mmWave spectrum provides opportunity for self-backhauling, without limiting the spectrum to being used for the access links. On top of that, the inherent multi-beam and MIMO support in NR reduce cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

The specifications for IAB strives to reuse existing functions and interfaces defined in NR. In particular, MT, gNodeB-DU (gNB-DU), gNodeB-CU (gNB-CU), User Plane Function (UPF), Access and Mobility Functions (AMF) and Session Management Function (SMF) as well as the corresponding interfaces NR Uu (between MT and gNodeB (gNB)), F1, Next Generation (NG), X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 1 illustrates a high level architectural view of an IAB network. Specifically, FIG. 1 illustrates a reference diagram for IAB in standalone mode, which contains one IAB-donor and multiple IAB-nodes as provided in 3GPP TR 38.874. The IAB-donor is treated as a single logical node that comprises a set of functions such as gNB-DU, gNodeB-Central Unit-Control Plane (gNB-CU-CP), gNodeB-Central Unit-User Plane (gNB-CU-UP), and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user plane (UP) protocol stack for IAB. FIGS. 3A, 3B, and 3C illustrate the baseline control plane (CP) protocol stack for IAB. As illustrated, the chosen protocol stacks reuse the current CU-DU split specification in rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IP Security (IPsec) in the case of UP, and Datagram Transport Layer Security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the user equipment (UE) bearer data to the proper backhaul Radio Link Control (RLC) channel (and also between ingress and egress backhaul RLC channels in intermediate IAB nodes) to satisfy the end to end Quality of Service (QoS) requirements of bearers.

Though there is no final agreement in RAN2, there is a consensus about including the BAP entity in both MT and DU parts of the IAB-node protocol stack. Modelling the BAP layer this way facilitates the realization of the routing and mapping functionalities of the adaptation layer.

Before discussing the operations of the two Backhaul Adaptation Protocol (BAP) entities, the first thing to consider is whether the radio bearers carrying CP/UP traffic for the MT functionality of an IAB node should be handled separately from the BH Radio Link Control (RLC) channels. Note that the BH RLC channels are used to carry traffic to/from the IAB DU functionality, which could be either be intended for the UEs served by the IAB node or for the child IAB nodes. In our view, they (e.g. radio bearers and BH RLC channels) should be handled separately by employing different logical channel identifiers (IDs).

The process flow for the DL includes:
1) When a packet arrives at the IAB donor DU (from the donor CU) and is processed first by the upper layers (as there is no MT BAP layer at the donor DU).
   a) If the packet is destined to UEs directly connected to the IAB donor DU or it is an F1-AP traffic destined at the IAB donor DU, it is forwarded to higher layers (IP/UDP/GTP-U for UP, IP/SCTP/F1-AP for CP)
   b) Otherwise (i.e. it is to be forwarded further downstream), it is forwarded to the DU BAP layer.
2) When a packet arrives at an IAB node (from a parent IAB node or IAB donor DU) via backhaul RLC channels is processed first by the MT BAP layer.
   a) If the packet is destined to UEs directly connected to the IAB node or F1-AP traffic destined at the IAB node's DU, it is forwarded to higher layers (IP/UDP/GTP-U for UP, IP/SCTP/F1-AP for CP)

b) Otherwise (i.e. it is to be forwarded further downstream, it is forwarded to the DU BAP layer.

In both 1b and 2b above, the DU BAP will determine which route (i.e. to which child node) the packet has to be forwarded to and which BH RLC channel within that route will be used for forwarding the packet downstream (the input information for the BH RLC mapping is still discussed in RAN2).

1) The process flow for the UL includes: When a packet arrives at the IAB donor DU (from a child IAB node) via backhaul RLC channels, it is processed first by the DU BAP layer and is forwarded to the donor CU (as the donor DU can be connected to at most one donor CU, there is no routing functionality required).
2) When a packet arrives at an IAB node in the UL direction:
   a) If it is coming from a child IAB node via backhaul RLC channels it is processed first by the DU BAP layer and, since every UL packet is destined to be forwarded to the donor CU, it is passed on to the MT BAP layer.
   b) If the packet is from a UE connected directly to the IAB node, or it is an F1-AP traffic originating from the IAB node, it is processed first by the higher layers (IP/UDP/GTP-U for UP, IP/SCTP/F1-AP for CP), and is forwarded to the MT BAP layer.

In both 2a and 2b above, the MT BAP will determine which route (i.e. which parent node) the packet has to be forwarded to and which BH RLC channel within that route will be used for forwarding the packet upstream.

It has been agreed in 3GPP that multi-connectivity is allowed in an IAB network. That is, there can be more than one route towards an IAB node (i.e. an IAB node can have more than one parent node). The two proposed methods for realizing this are:

An IAB node having multiple MT entities, each entity connecting to a different parent node (or cell of a parent node)

Using dual connectivity concept of NR, where the MT part of the IAB node connects to two difference cell groups, one belonging to the master cell group (MCG) and another to the secondary cell group (SCG).

Currently in NR, dual connectivity (DC) is supported by setting up multiple UE bearer contexts in the DUs that serve the UE. These different UE contexts are identified in as part of F1-U (GTP tunnels) to the DU serving the UE. FIG. 4 illustrates support for NR DC to UEs.

The DC aspects are transparent to UE application layers. For example, the UE just sends/receive data from a Data Radio Bearer (DRB) which could be configured as a master cell group (MCG), secondary cell group (SCG) or split DRB. In case of the split DRB, the splitting point is below Packet Data Convergence Protocol (PDCP) and relying on various NR PDCP functions to handle re-ordering, re-transmission and duplication removal.

As agreed at the last 3GPP meeting (RAN2_105 bis, April, Xi'an, China), it is possible to reuse the NR-DC framework for setting up multi-connectivity to IAB nodes. However, for NR-DC to be used for IAB node, some changes to the UP aspects are required since:

The IAB nodes do not terminate PDCP for F1-U traffic
Similarly, the parent nodes to the IAB do not terminate F1-U for other IAB nodes (the forwarding is instead handled by adaptation layer)

The agreed architecture based on full F1-U support to the IAB node does not assume that there is any CU-UP function for traffic going to the IAB node (instead the DU handles IP routing)

Similarly, the IP address for NR DC terminates in the UPF, which is not in line with the agreed architecture.

It would, however, be possible to adopt a simplified version of NR DC to enable support for multi-path that is still in line with existing architecture assumptions and avoids additional complexities such as tunneling in tunneling, assuming the following:

No split bearers are supported
Avoiding introduction of CU-UP functionality and re-ordering functionality etc.
Each path should be associated with a separate BAP routing identifier
Avoiding GTP tunnels to the parent nodes (carrying GTP tunnels to IAB node).
Each path should be associated with its own IP address making the paths visible on the F1 application layer.
Making it possible to setup paths through different Donor DUs With the assumptions above, it would be possible to support redundancy and rudimentary load balancing mechanism on the F1 application layer using things like:

Multipath SCTP
Smart load balancing of UE GTP tunnels to different paths

There have been proposals to study more advanced load balancing mechanisms for IAB node in later releases. It has been observed, for example, that for the user plane it is possible to support a simplified version of NR DC for IAB nodes where each path is seen as a separate IP connection which can be used by the application layer (F1-C/F1-U) for redundancy and rudimentary load balancing. This is discussed in TR 38.874 section 9.7.9). It has, thus, been proposed that, when using NR-DC to support multi-connectivity for IAB nodes in Rel-16 the following assumptions should be made:

1. Only MCG, or SCG BH bearers should be supported, no split BH bearers should be supported.
2. Each separate connection to a given IAB node should be associated with a separate BAP identifier (e.g. address, path, address+path)
3. Each separate connection should be associated with at least 1 separate IP address to support multiple connections to use different Donor DU, and allow selection of which connection to use by the end nodes (IAB node, CU)

FIG. 5 illustrates single connectivity before DC is setup. Thus, FIG. 5 illustrates the starting scenario. The IAB node 1 is connected via IAB node 2 and Donor DU 1 towards the Transport Network Layer (TNL). The Donor DU 1 route any packets destined to the IP address 1 of the IAB node 1 over the wireless backhaul to IAB node 2. The routing is based on a BAP identifier 1 associated with the IP address 1.

Based on, for example, IAB node 1 RRC level measurements, the Donor CU determines IAB node capabilities that the IAB node 1 should establish dual connectivity to IAB node 3. Existing NR DC RRC procedure is used to establish an SCG connection to the IAB node 3. As part of this message the Donor CU will configure the BAP identifier for the SCG link to the IAB node 3. The Donor CU will also configure one or more Backhaul RLC channels between the IAB node 1 and IAB node 3 as well as a new BAP route for the new connection. Once the new path is setup on the BAP, the IAB node 1 can be allocated a new IP address 2 for the new connection.

FIG. 6 illustrates multiple connectivity after DC is set up. Specifically, FIG. 6 illustrates the end result such that the IAB node 1 is now connected via 2 paths, where each path has a separate IP address and can be used for F1-C/U application layer redundancy. It has been proposed that the Donor CU responsible for setting up DC to the IAB node will configure separate BAP identifiers for each connection, enabling allocation of separate IP addresses for each connection.

In case a child IAB node is connected to a parent IAB node which has support for multiple connections (as shown in the figure below for IAB node 0), it should be possible for this child IAB node to also utilize these multiple connections. For this reason, it should be possible to assign the child IAB node multiple BUP identifiers. When the IAB node receives multiple BUP identifiers it can request separate IP address for each BUP identifiers.

FIG. 7 illustrates multiple connectivity at intermediate nodes, leading to multiple connectivity of end nodes. An IAB child node connected to one or more upstream IAB node which uses NR-DC, can be allocated multiple BAP identifiers and IP addresses in order for it to be able to utilize the multi-connectivity.

With regard to the IAB node integration procedure, the setup and configuration (i.e. integration) for the IAB node is the first step in the operation of the IAB node. The integration procedure included the following steps:

1. MT setup

MT selects parent node (procedure is FFS).

MT authenticates with AMF (Uu procedures)

AMF authorizes MT at gNB (signalling agreed at RAN3#103)

gNB establishes SRBs with MT (Uu procedures)

gNB may establish DRBs and PDU session with MT (Uu procedures; if this is necessary is FFS)

PDU session may be used for OAM connectivity

2. Backhaul setup

Establishment of BH RLC channel between IAB-node MT and parent node.

RAN2 decided that this configuration is done by CU-CP (e.g. using RRC).

For this, MT's CU-CP needs to know that MT belongs to an IAB node and not a UE, which it may derive, e.g., from MT authorization (agreed at RAN3#103).

The BH RLC channel further has to be marked with the corresponding priority/QoS-class on IAB-node MT and parent node.

Establishment of adapt route(s) between IAB-node MT and IAB-donor DU. This includes:

Configuration of adapt routing identifier(s) on IAB-node MT and IAB-donor DU (RAN2; FFS), Configuration of routing entries on all IAB-node's ancestor nodes for new routing identifier (RAN2; FFS), IP address allocation to IAB-node for adapt interface, which is routable from wireline fronthaul via adapt route.

The IP address must be specific to IAB-donor DU so that CU can send IP packets to IAB-node via this specific IAB-donor DU and the new adapt route.

The IAB-donor DU has to support a pool of IP addresses that are routable from wireline fronthaul for all descendant IAB-nodes.

If IP assignment is done by CU, the CU must know IAB-donor-DU's available IP address pool for IAB nodes.

If IP assignment is done via DHCPv4/6 with DHCP proxy on IAB-donor-DU, as proposed in TR, a transport mechanism of ARP/NDP on top of adapt layer needs to be defined.

There may be other options for IP address allocation.

3. DU setup

DU establishes F1-C and cell activation using IP on adapt layer (procedure defined in TS 38.401 clause 8.5: F1 startup and cells activation).

This includes OAM support for IAB-node DU via backhaul IP layer.

It is important to note that the recommended architecture option (Option 1a in TR 38.874) can manage IP address assignment internally in the RAN without CN involvement. In that respect, the above baseline allows for DHCP-based IP address assignment and setting up the OAM after IP address assignment without MT establishing a PDU session. The three parts of the overall IAB node integration procedure is discussed below. FIG. 8 illustrates the IAB node integration procedure.

The first part of the IAB procedure is the MT functionality setup. The IAB node will first connect via its MT functionality using RRC setup procedure. After RRC connection setup, the MT functionality of the IAB node could perform NAS-level registration and authentication, but no PDU session establishment is required, as shown in FIG. 8. As depicted, the MT functionality setup may include:

1. The IAB node sends an RRCSetupRequest message to the gNB-DU.
2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the C-RNTI allocated by the gNB-DU.
3. The gNB-CU allocates a gNB-CU UE F1AP ID for the IAB node and generates RRCSetup message towards the IAB node. The RRC message is encapsulated in the DL RRC MESSAGE TRANSFER message.
4. The gNB-DU sends the RRCSetup message to the IAB node.
5. The IAB node sends the RRC CONNECTION SETUP COMPLETE message to the gNB-DU. The S-NSSAI IE in the RRC CONNECTION SETUP COMPLETE message indicates the IAB node.
6. The gNB-DU encapsulates the RRC message in the UL RRC MESSAGE TRANSFER message and sends it to the gNB-CU.
7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.
9. The gNB-CU sends the IAB CONTEXT SETUP REQUEST message to establish the IAB node context in the gNB-DU. In this message, it may also encapsulate the SecurityModeCommand message.
10. The gNB-DU sends the SecurityModeCommand message to the IAB node.
11. The gNB-DU sends the IAB CONTEXT SETUP RESPONSE message to the gNB-CU.
12. The IAB node responds with the SecurityModeComplete message.

13. The gNB-DU encapsulates the RRC message in the UL RRC MESSAGE TRANSFER message and sends it to the gNB-CU.
14. The gNB-CU generates the RRCReconfiguration message and encapsulates it in the DL RRC MESSAGE TRANSFER message. The RRCReconfiguration could include a configuration of one or more JAB backhaul bearers.
15. The gNB-DU sends RRCReconfiguration message to the JAB node.
16. The JAB node sends RRCReconfigurationComplete message to the gNB-DU.
17. The gNB-DU encapsulates the RRC message in the UL RRC MESSAGE TRANSFER message and sends it to the gNB-CU.
18. The gNB-CU sends the INITIAL CONTEXT SETUP RESPONSE message to the AMF.

After the NAS registration, UE context for the JAB node can be created in the RAN (without any PDU session resources). In this way, there is no need to support any SMF/UPF functionality for the JAB nodes. NAS Rel-15 already separates the NAS registration from the PDU session establishment, making it possible to only perform registration without setting up PDU sessions, as well as setting up a UE context in RAN without PDU session resources.

The second part of the JAB procedure is the backhaul setup. Once the UE context for the JAB node is setup in the RAN, the RAN will establish one or more backhaul bearers that can be used for IP address assignment to JAB node. For the situations where the JAB node is not directly communicating with the IAB-Donor node, but via other (already attached/connected) JAB nodes, the forwarding information in all intermediate JAB nodes will be updated due to the setup of new JAB node.

The third part of the JAB procedure is the DU functionality setup. After establishing connectivity to the operator's internal network, the DU functionality of JAB node and its cells/sectors need to be configured by the OAM before the DU can send an F1 Setup Request message to its corresponding CU, i.e. IAB-CU. The recommended architecture option for JAB supports the full IP connectivity to the JAB node, making it possible that the DU functionality can have direct IP connectivity to the OAM, instead of relying on the MT functionality to establish a special PDU session in the CN for OAM.

At this point, the JAB node will have established one or more backhaul bearers that can be used for creating TNL connectivity toward gNB-CU and getting TNL address (e.g. IP address and port assignments). Next, the JAB node can utilize the F1 Startup and Cells Activation procedures described in TS 38.401 to activate its cells and become operational.

Finally, after configuring the DU functionality of the IAB node, the IAB node becomes operational as a DU and UEs will not be able to distinguish it from other gNBs. As such, it can start serving UEs like any other DU/gNB.

After activating its cells, the IAB node is operational and can serve the UEs. The UEs can connect to the IAB node via the UE Initial Access procedure described in TS 38.401.

The procedure for initial IAB node access can be based on the UE Initial Access signalling flow with slight modifications to fulfil the IAB node requirements. Meanwhile, for activation of IAB node DU cells, the F1 Startup and cells activation procedure defined in TS 38.401 can be reused as is. Taking the above into account, certain embodiments of the present disclosure propose the process for integrating the IAB node into the NG-RAN described below and shown in FIG. 8.

An IAB-node needs to multiplex the UE DRBs to the BH RLC-Channel There are two options to be considered on bearer mapping in IAB-node. The first option is a one-to-one mapping between UE DRB and BH RLC-channel FIG. 9 illustrates an example of one-to-one mapping between UE DRB and BH RLC-Channel In this option, each UE DRB is mapped onto a separate BH RLC-channel. Further, each BH RLC-channel is mapped onto a separate BH RLC-channel on the next hop. The number of established BH RLC-channels is equal to the number of established UE DRBs.

Identifiers (e.g. for the UE and/or DRB) may be required (e.g. if multiple BH RLC-channels are multiplexed into a single BH logical channel). Which exact identifiers are needed, and which of these identifier(s) are placed within the adaptation layer header depends on the architecture/protocol option.

The second option is a many-to-one mapping between UE DRBs and BH RLC-channel FIG. 10 illustrates an example of many-to-one mapping between UE DRBs and BH RLC-channel For the many-to-one mapping, several UE DRBs are multiplexed onto a single BH RLC-channel based on specific parameters such as bearer QoS profile. Other information such as hop-count could also be configured. The IAB-node can multiplex UE DRBs into a single BH RLC-channel even if they belong to different UEs. Furthermore, a packet from one BH RLC-channel may be mapped onto a different BH RLC-channel on the next hop. All traffic mapped to a single BH RLC-channel receive the same QoS treatment on the air interface.

Since the BH RLC-channel multiplexes data from/to multiple bearers, and possibly even different UEs, each data block transmitted in the BH RLC-channel needs to contain an identifier of the UE, DRB, and/or IAB-node it is associated with. Which exact identifiers are needed, and which of these identifier(s) are placed within the adaptation layer header depends on the architecture/protocol option.

It has been agreed to support both N: 1 and 1:1 mapping in Release 16.

Radio bearers is a concept used both in LTE and NR. The radio bearers provide transfer of data packets or signaling messages over the radio interface. Each radio bearer is typically associated with an instances of the PDCP and RLC protocols on both the UE and network side.

In legacy LTE, the UE was configured with RRC configuration that included the information of both lower and higher layer aspects in one common information element (IE) (radioResourceConfigDedicated). In NR (and also LTE rel-15, where LTE can be used in dual connectivity mode with a non standalone NR cell), the structure has been modified so that the lower and higher layer configurations are split in different IEs.

The upper layer aspects (PDCP and SDAP) are configured using the radioBearerConfig IE, while the lower layer configurations are done via the cellGroupConfig IE that are part of the RRCReconfiguration message.

If the UE is operating in standalone mode, it will usually have only one radio bearer configuration in the radioBearerConfig IE, that contains the higher layer configurations of that bearer. If the UE is operating in dual connectivity (DC) mode or is being prepared for DC (as it is possible to have a secondary node terminated bearer without any radio resource being allocated towards the secondary node, which is known as Secondary node terminated MCG bearer), then radioBearerConfig2 IE will contain the bearers that are associated with the secondary node.

The radioBearerConfig IEs contain the security setting of the bearers (e.g. encryption/integrity protection algorithms) and the configuration of the SDAP and PDCP layers.

The UE can be configured with one or more cell group configurations (cellGroupConfig) (in rel-15, this is limited to a maximum of two). In the cell group configuration, a lot of information is provided regarding the cells that are associated with the cell group. If the UE is operating in single connectivity, then it will have only one cell group configuration that contains configuration of the primary cell (PCell) and the secondary cells (SCells), if any, that are operating in carrier aggregation (CA) mode. And this cell group is known as the master cell group (MCG) configuration. If the UE is operating in DC, then it will have an additional cell group configuration called secondary cell group (SCG) configuration that contains the configuration of the primary secondary cell (PSCell) and Secondary cells (SCells), if any, if the UE is operating in CA mode in the SCG as well.

Apart from the MCG/SCG Cells (PCell, PSCell, SCells) configurations, the cell group configurations also contain an RLC bearer configuration (RLC-BearerConfig) that is used to define the lower layer configurations for a given bearer (i.e. RLC/MAC). In the RLC bearer configuration, the servedRadioBearer IE associates the RLC bearer configuration with a particular bearer (be it a data radio bearer, DRB, or a signaling radio bearer, DRB).

A bearer can be associated with more than one RLC bearer configuration (if a bearer is a split bearer that uses the MCG and SCG, or it is a bearer belonging to the MCG or SCG only but uses duplication via carrier aggregation, known as CA duplication). In this case, the PDCP configuration (pdcpConfig) contains the moreThanOneRLC IE that links the PDCP with the two RLC bearers.

As can be seen in the signaling the Radio Bearer can be identified by a DRB ID, or SRB ID and a logical channel. The DRB/SRB IDs are used for different purposes such as input to PDCP encryption and/or integrity protection. The logical channel is used for MAC multiplexing.

There currently exist certain challenge(s). As described above, the specification of an IAB network in a multi-hop, multi-connectivity scenarios are currently being discussed in 3GPP. Though some of the high-level aspects are agreed, there are a lot of open issues. One problem is how the forwarding information (routing information) is configured in the IAB node. It has not been agreed which protocol to use for configuring this. Furthermore, there is no agreement on how the next hop link should be identified. In the downlink, this is about identifying the next child IAB node in the chain in case multiple IAB child nodes are connected. In the uplink, the problem is how to identify the parent node (an IAB node or Donor DU) in case the IAB node is connected via multiple paths (e.g. use Dual Connectivity). Solutions have been considered on how the routing can be handled in the DL by using F1-AP signaling; however, how to configure the uplink routing is not clear.

SUMMARY

Certain aspects of the present disclosure and their embodiments may provide solutions to these or other challenges. Certain embodiments of the present disclosure propose mechanisms that make it possible to configure, setup, and/or operate the different node within a multi-hop Integrated Access Backhaul (IAB) network so that packets can be routed properly to their intended destination.

According to certain embodiments, a method performed by an IAB node includes determining at least two parent nodes within a multi-hop IAB network. The IAB node receives an uplink routing configuration associated with a cell group configuration that identifies a selected one of the parent nodes. Based on the uplink routing configuration associated with the cell group configuration, packets are sent to at least one of the at least two parent nodes.

According to certain embodiments, a network node operating as an IAB node includes processing circuitry configured to determine at least two parent nodes within a multi-hop IAB network. The processing circuitry receives an uplink routing configuration associated with a cell group configuration that identifies a selected one of the parent nodes. Based on the uplink routing configuration associated with the cell group configuration, the processing circuitry sends packets to at least one of the at least two parent nodes.

Certain embodiments may provide one or more technical advantage(s). For example, certain embodiments may make it possible to configure the uplink routing in IAB networks in an efficient way. By configuring the routing or forwarding table as part of the RRC Cell Group configuration, it may be possible to associate different BAP identifier(s) with the correct Cell Group and parent node without the need to send an explicit node identifier in the table. Thus, certain embodiments may optimize the signaling, which may mean reduced power consumption and interference. The signaling is further optimized by defining Default Cell Groups for which all packets associated with BAP identifiers which are not explicitly signaled are routed to.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
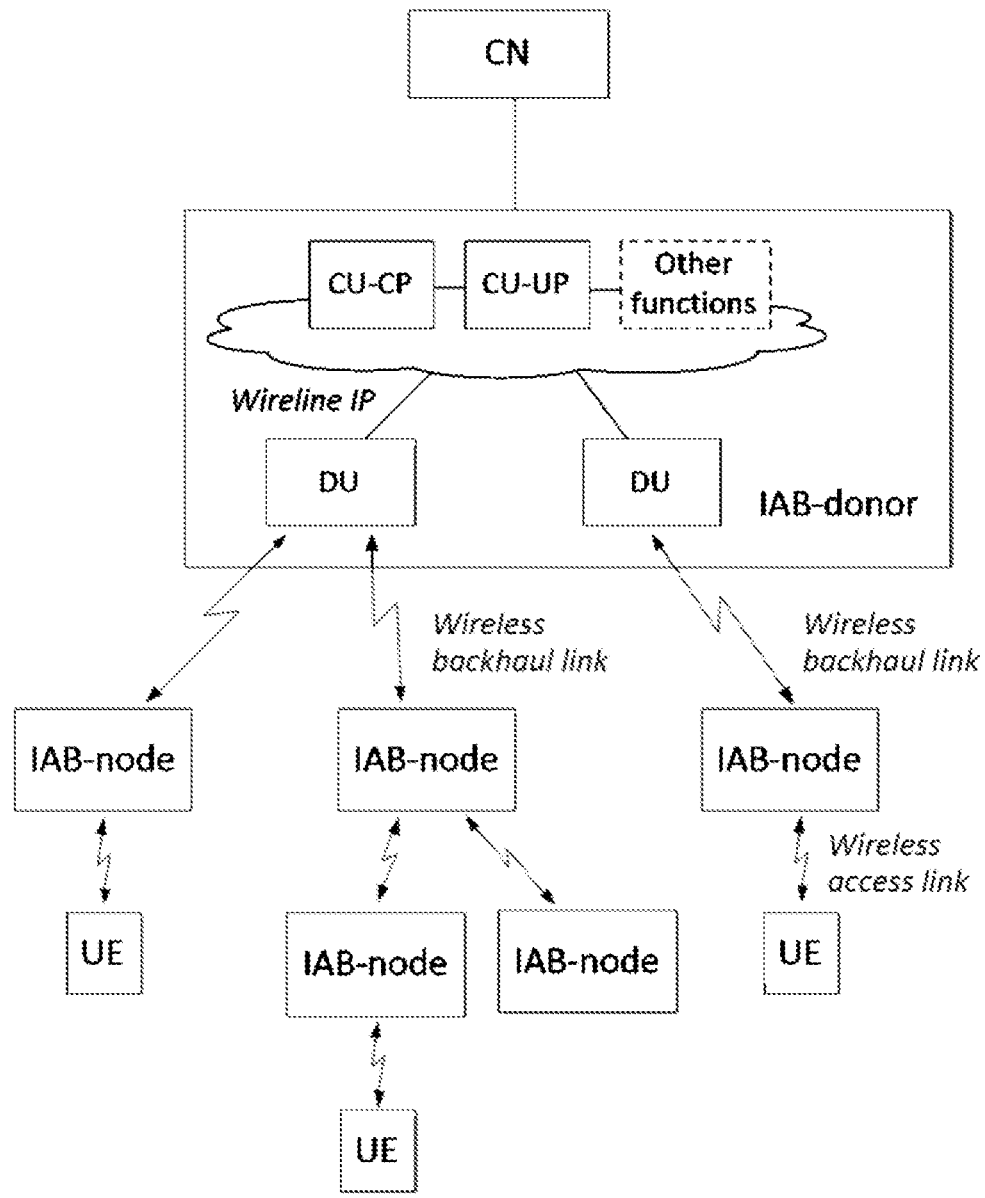
FIG. 1 illustrates a high level architectural view of an IAB network.
Figure 2:
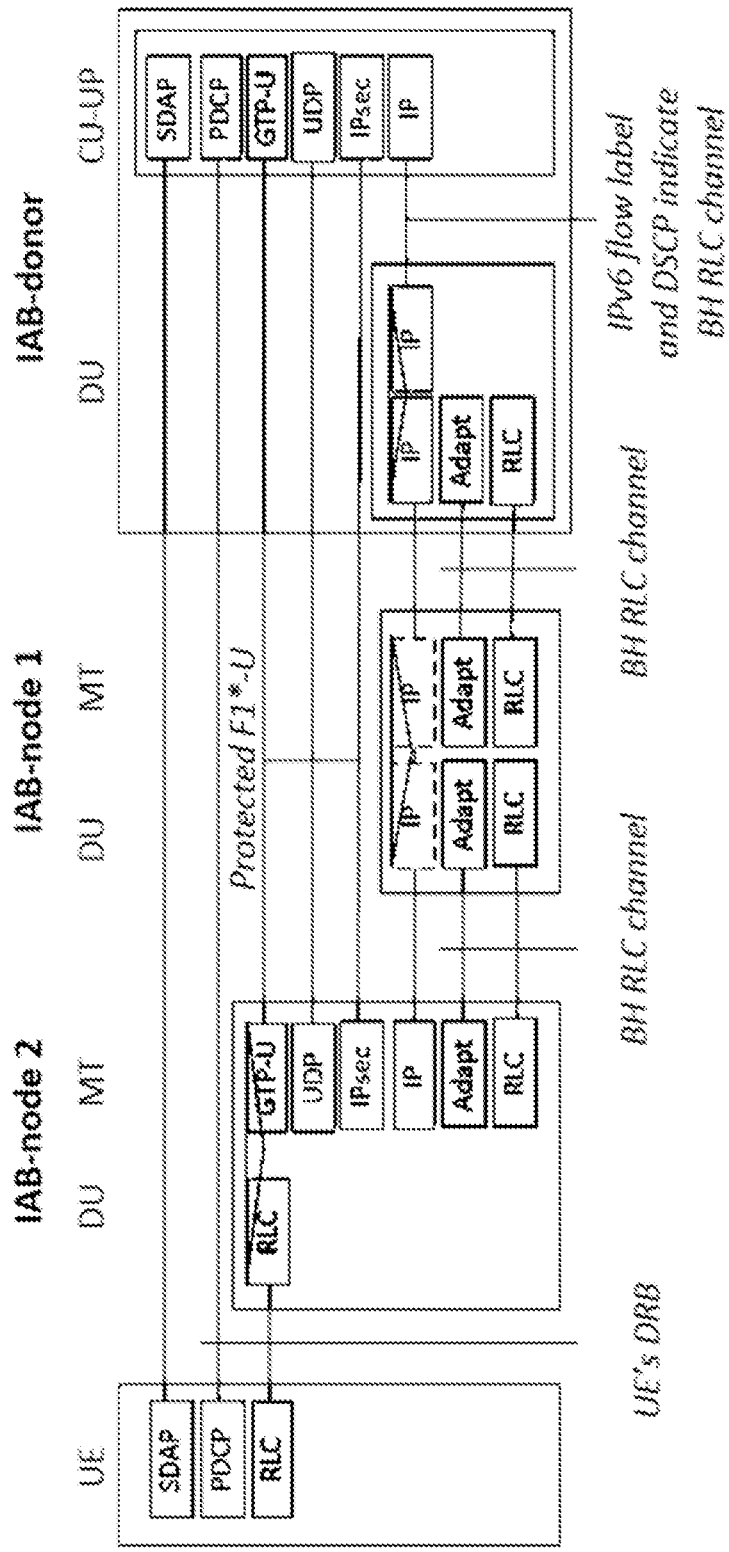
FIG. 2 illustrates the baseline UP protocol stack for IAB.
Figure 3A:
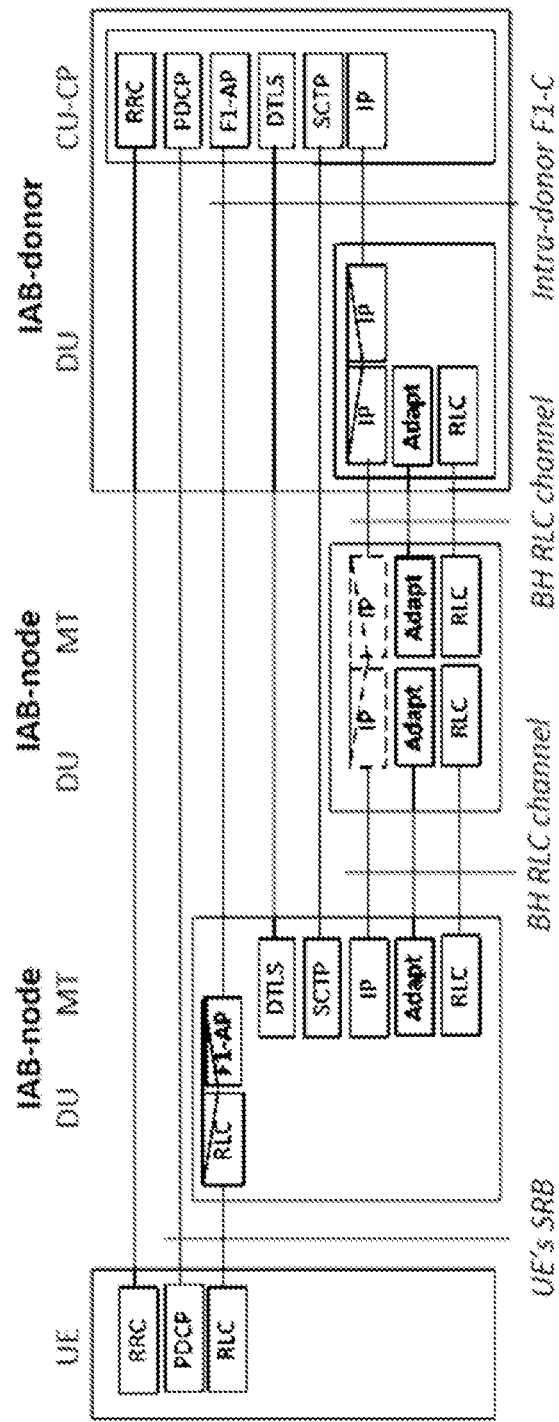
FIGS. 3A, 3B, and 3C illustrate the baseline CP protocol stack for IAB.
Figure 3B:
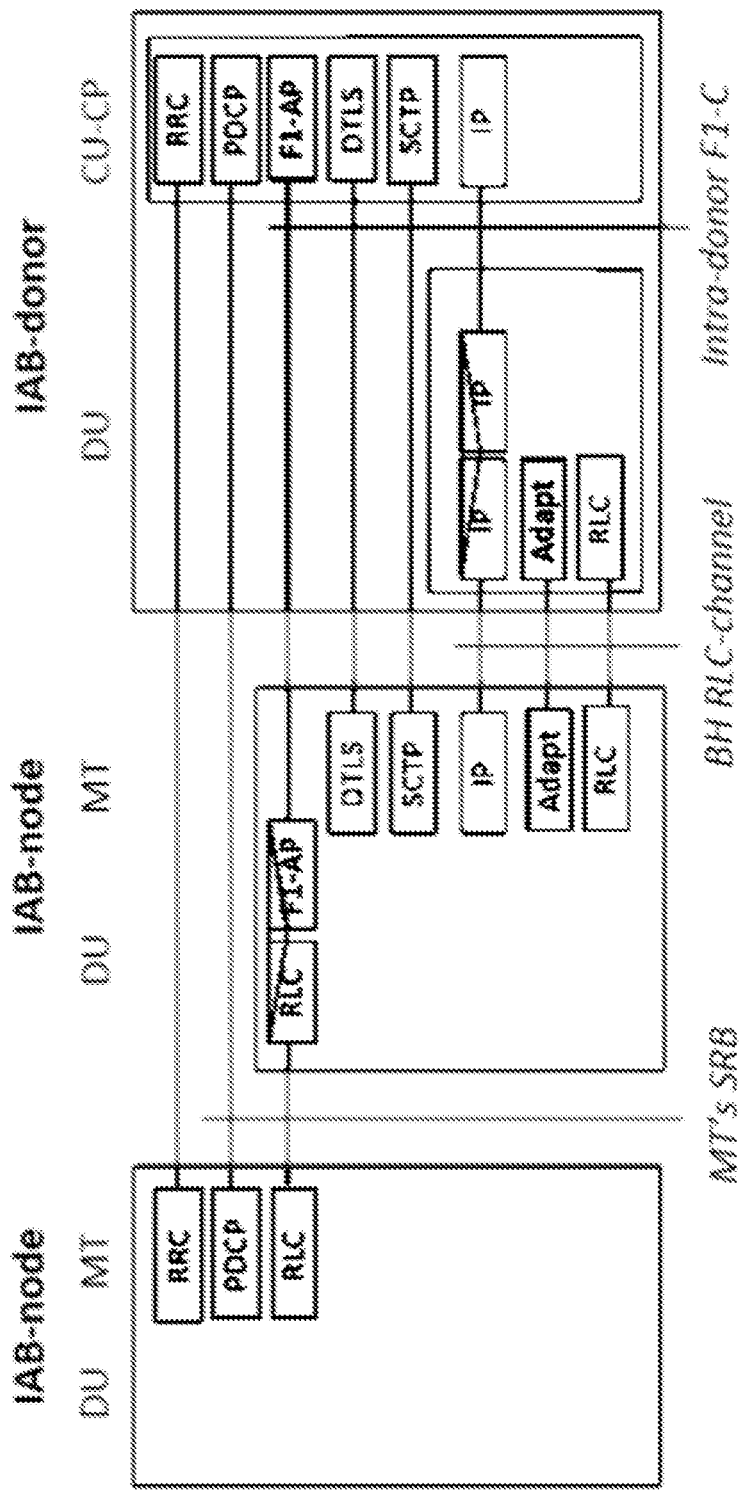
Figure 3C:
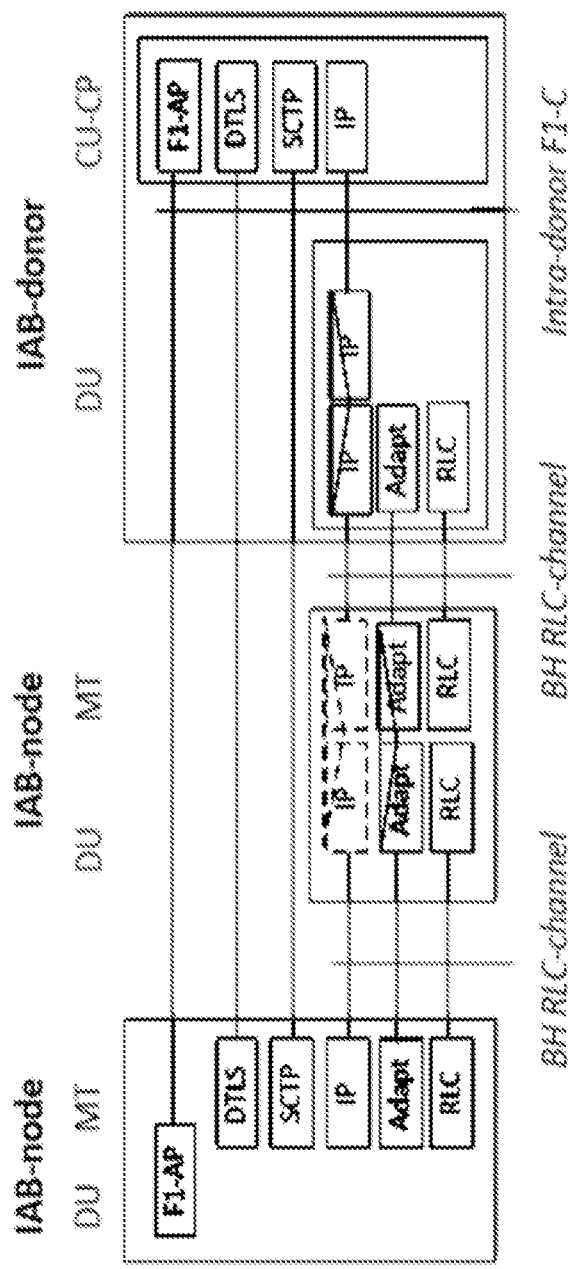
Figure 4:
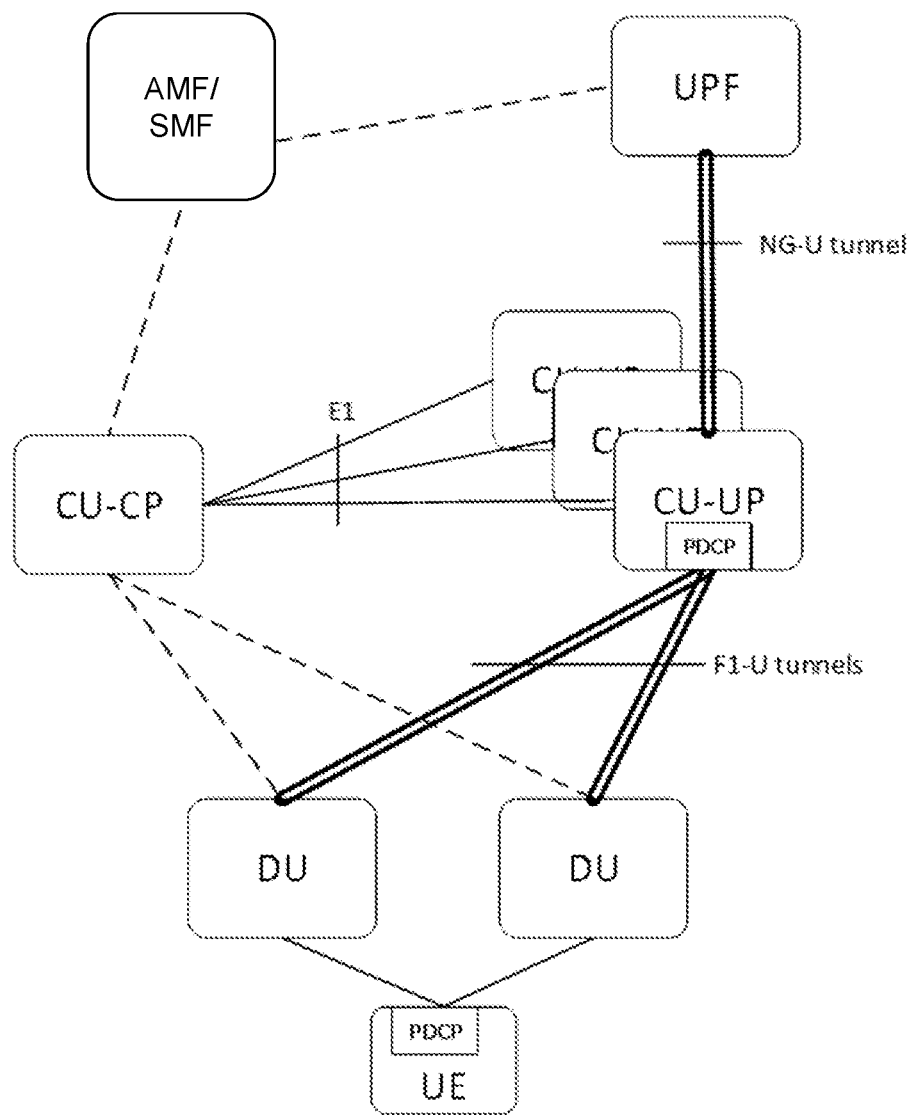
FIG. 4 illustrates support for NR DC to UEs.
Figure 5:
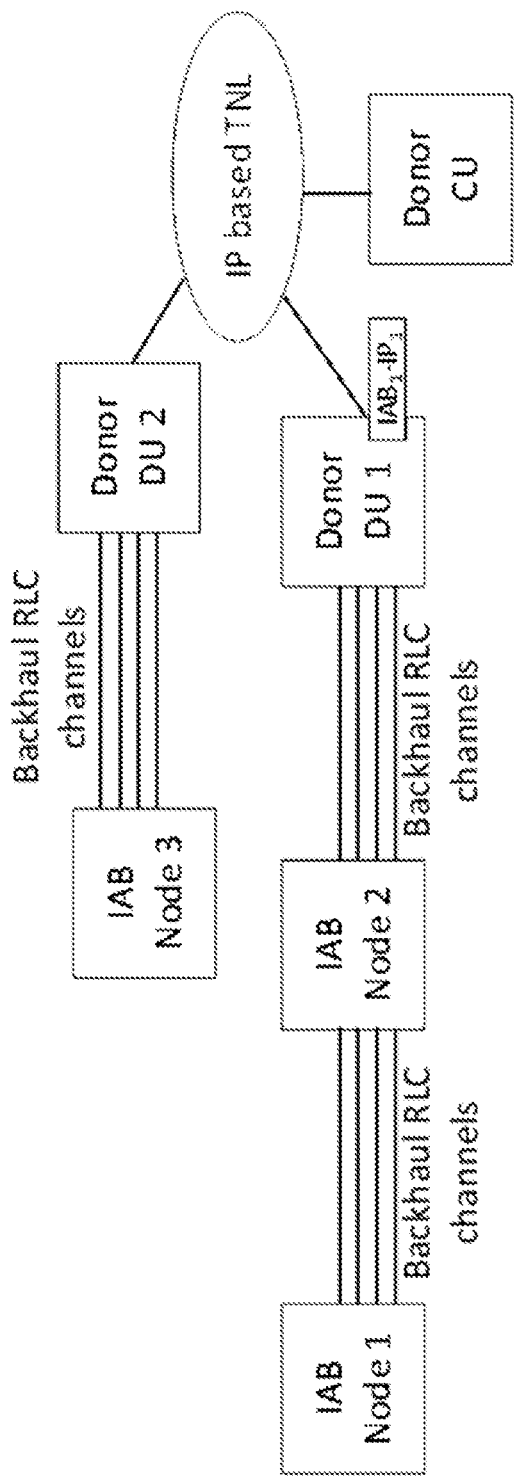
FIG. 5 illustrates single connectivity before DC is setup.
Figure 6:
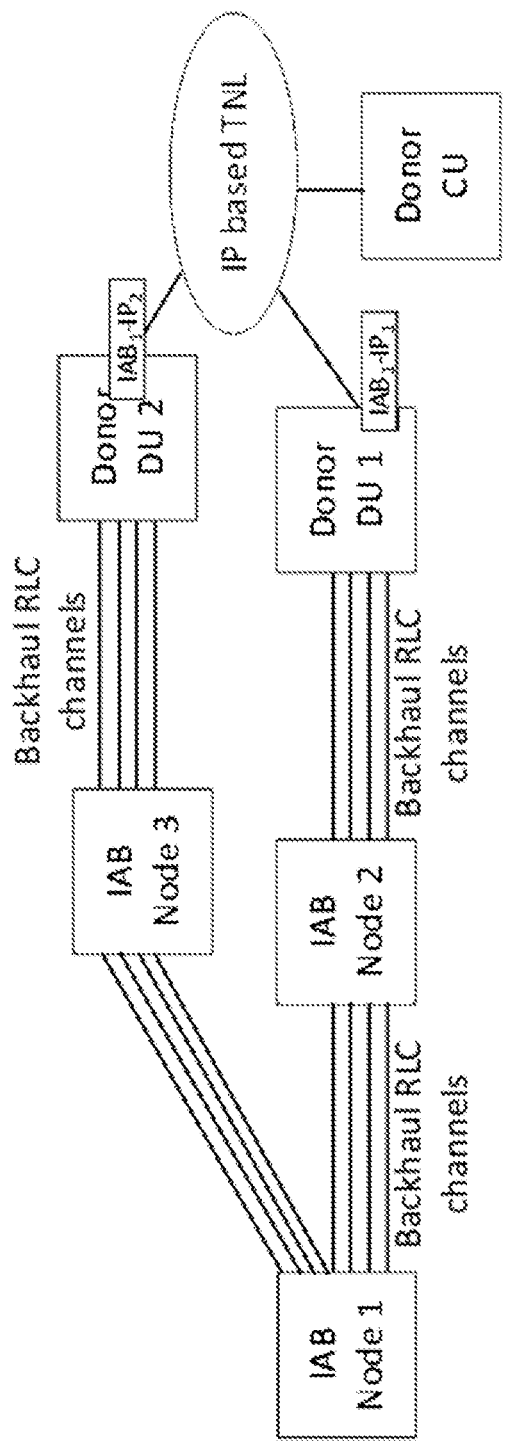
FIG. 6 illustrates single connectivity before DC is setup.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain embodiments of the present disclosure propose mechanisms that make it possible to configure, setup, and/or operate the different node within a multi-hop IAB network so that packets can be routed properly to their intended destination. Examples of such proposed mechanisms may include:

According to certain embodiments, mechanisms may be provided to configure the uplink (UL) routing as part of the RRC Cell Group configuration which is used to configure the lower layers of each link to the parent node (there will be one cell group configuration per link). In this way, there is no need to signal any explicit Next Hop link identifier in the UL.

According to certain embodiments, the signaling could consist of a list of BAP identifiers associated the Cell Group. The BA identifier could be a target and/or sources address and/or a path identifier.

According to certain embodiments, when the IAB nodes receives the configuration, the IAB nodes will route all UL packets based on the BAP identifier in packet header to the parent node associated with the Cell Group.

According to certain embodiments, in order to optimize the signaling, it may be possible to define one of the Cell Groups to be the default cell group for which all traffic should send which is associated with BAP identifiers that are not explicitly signaled. The default Cell Group may either be hardcoded in the standard such as, for example, the Master Cell Group or a Secondary Cell Group, or the default Cell Group maybe signaled to the IAB node using RRC signaling.

According to certain embodiments, in order to support load balancing between multiple links, it may be possible to configure load balancing parameters also associated with the Cell Groups. Load balancing parameters may include thresholds for when one link should be preferred over the other, or load balancing parameters may include weights associated with each link which is used for prioritization.

Figure 8:
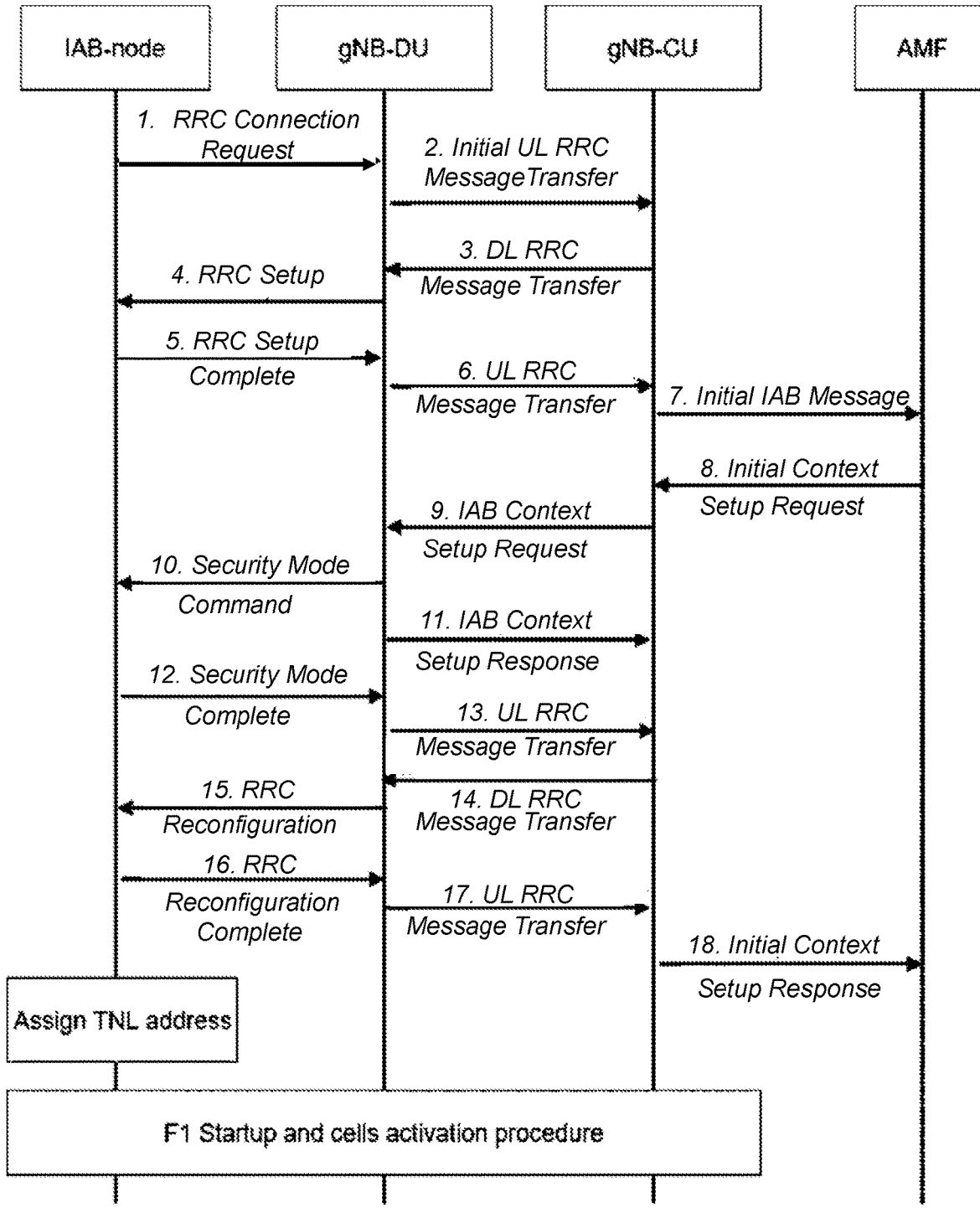
FIG. 8 illustrates the IAB node integration procedure.
Figure 9:
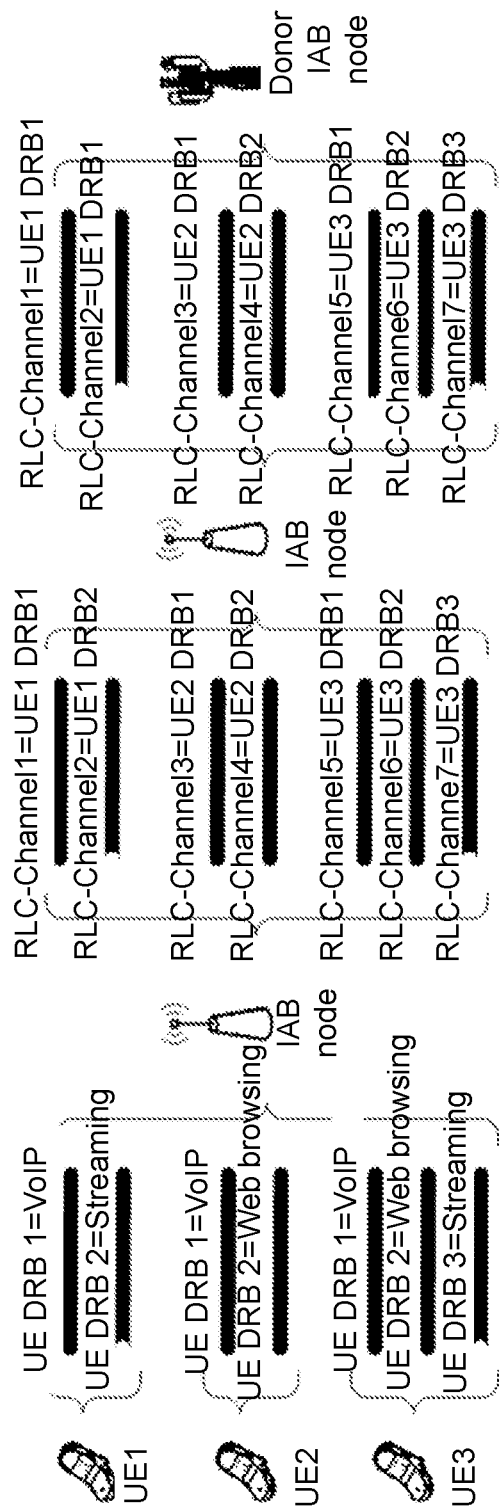
FIG. 9 illustrates an example of one-to-one mapping between UE DRB and BH RLC-Channel.
Figure 10:
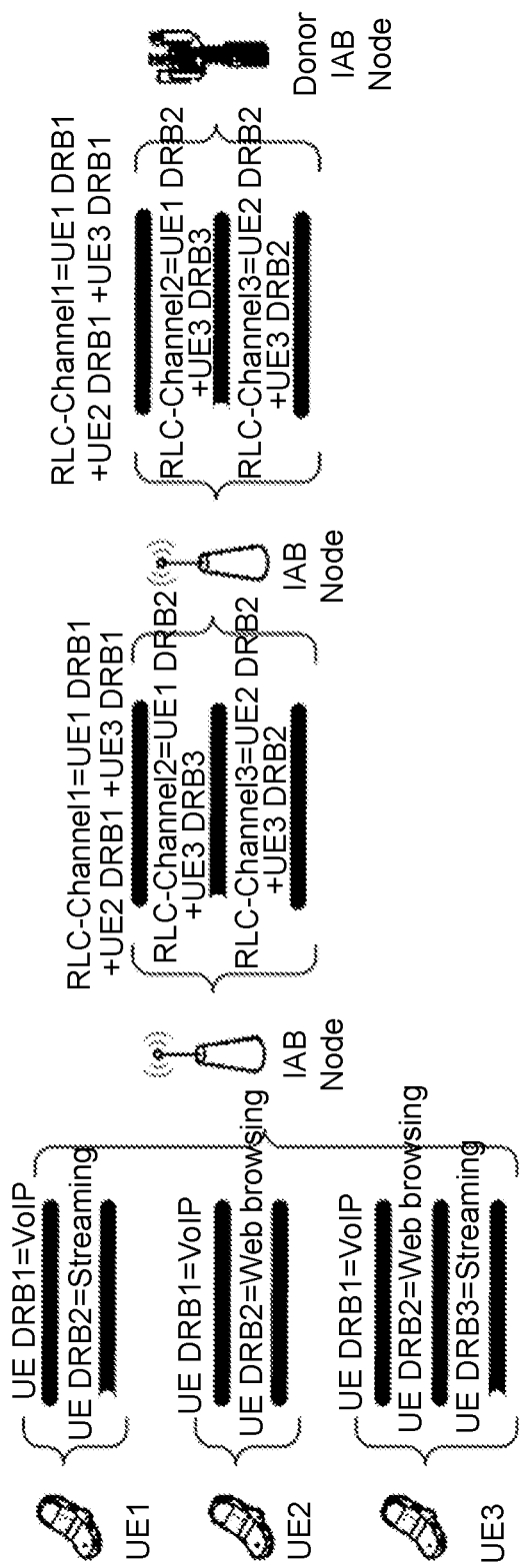
FIG. 10 illustrates an example of many-to-one mapping between UE DRBs and BH RLC-channel.

According to certain embodiments, a new IAB node being integrated may be set up. For example, the MT BAP entity of the IAB node may be setup in the first RRC Reconfiguration message that is sent to the IAB node after the MT RRC connection establishment. This message may include message 15 illustrated in FIG. 8. According to certain other embodiments, the RRC reconfiguration message that is used to setup the MT BAP entity may be a separate RRC message that is sent after the first RRC reconfiguration message to the MT.

According to certain embodiments, the RRC configuration that is used to setup the MT entity may also contain information related to some BH RLC channels/bearers to be setup between the IAB node and its parent node. The BH RLC channels/bearers configuration may be performed by reusing the radioBearerConfig/RLC-bearerConfig IEs, in a particular embodiment.

It should be noted only a sub set of BH RLC channels need to be configured at this point. For example, BH RLC channels that will be used to transport the F1 setup request message in the subsequent DU setup phase of the IAB node integration procedure need to be configured. However, additional BH RLC channels can be setup/configured later on an as needed basis such as, for example, when the IAB node starts serving a child IAB node, when the IAB node starts serving a UE that has a bearer that needs 1:1 mapping, etc.

If the network is employing only N:1 mapping, it may be possible to configure all the BH RLC channels that are required for transporting all types of traffic all at once.

Thus, according to certain embodiments, the MT BAP and some BH RLC channels are setup in the first RRCReconfiguration message that is sent to the MT part of an IAB node. In a particular embodiment, at least one BH RLC channel is setup for enabling transporting the messages for the F1 setup procedure.

For DL traffic, an IAB node's MT BAP determines whether an incoming packet is destined to itself (i.e. data belonging to F1-AP or a DRB for a UE being served for an IAB node) or it is to be forwarded to a child node. This is accomplished by checking the BAP header and looking into the BAP identifier, which may be a destination IAB node address or path identifier or a combination, as it is still FFS in 3GPP what is to be included in the BAP header for routing purposes. Thus, the IAB node may need to know its own IAB node BAP identifier. In case the IAB node can be accessed via multiple paths/routes, the IAB node may have different addresses/identifiers associated with it. Thus, several BAP identifiers can be included in the MT BAP configuration.

According to certain embodiments, the initial MT BAP configuration may contain the IAB node's own BAP identifier(s) used in DL.

For UL traffic, an IAB node's MT BAP will need to insert the MT BAP identifier(s) for UL traffic from the IAB node itself (received on access link). These identifier(s) may be the same or different from the identifier(s) used in DL.

In case the IAB node is connected via multiple connections such as, for example, using NR-DC, the IAB node may need to determine to which route the packet has to be forwarded in the UL and which BH RLC channel within that route will be used for forwarding the packet upstream. Thus, the initial MT BAP configuration may also contain information of which BAP identifier(s) of the IAB node are associated with which IAB parent node.

According to certain embodiments, the initial MT BAP configuration may contain the IAB node's BAP identifier(s) used in UL. According to a particular embodiment, the BAP identifiers(s) in the UL can be the same as the BAP identifier(s) in the DL (in which case, the identifier(s) signalled for the DL will be used also for the DL).

According to certain other embodiments,
the initial MT BAP configuration could contain information of which BAP identifier(s) of the IAB node are associated with which IAB parent node (IAB node or donor DU).

In case the IAB node has multiple parents (e.g. NR-DC), then the IAB node may be configured with multiple cell groups (e.g. MCG and SCG). In that case, the identifiers associated with each cell group may be included in the cell group configurations.

According to certain embodiments where the IAB node is connected via DC, the initial MT BAP configuration may contain information of which BAP identifier(s) of the IAB node are associated with which cell group (e.g. Identifier A with MCG, identifier B with SCG). If multiple paths are available to the IAB node, the IAB node may have to determine to which path/parent/cell the packets of UEs that it is serving has to be sent. There are several ways of determining this:

Reflective routing: UL packets will use the same way as DL packets for a given UE bearer. The UE will save the BAP identifier that is used for receiving the DL packets and will use the same identifier for the UL packets.

Adopt/enhance split bearer principle: That is, one of the cell groups or associated BAP identifiers is configured as a primary path, and another cell group can be used as a secondary path. When the UL buffer threshold for that bearer is below a certain configurable threshold, only the primary path will be used. When the threshold becomes above the threshold, both paths may be used (e.g. MT will request for radio resources, e.g. via BSR/SR towards both cell groups, and the packet will be put on the cell group that gives the grant first).

Only one path used under normal conditions, other path(s) only used for fallback/backup: In this case, one path will be configured as the primary and the others are configured as secondary as in the previous case, but the secondary ones are used only in case there is something wrong with the primary one (e.g. when RLF is detected on the primary path/link).

Priority among the different paths: Here the different cell groups or associated BAP identifiers are given different priorities. The IAB node will try to get resources from the top priority one when it has UL data to send (e.g. via BSR), if it doesn't get it (e.g. within a configurable time), the next lower priority one will be tried, and so on.

A combination of the above methods are also possible.

According to certain embodiments, reflective routing may be applied, where the UL packets of a given bearer will take the same as the path taken by the DL packets that belong to the same bearer.

In a particular embodiment of a NR-DC scenario, one of the cell groups or associated BAP identifier may be configured as the primary path and the other one(s) as secondary path(s) and may be used only when the UL buffer is above a certain configurable threshold.

In another particular embodiment of a NR-DC scenario, only one of the cell groups or associated BAP identifiers may be used in normal operating conditions, and the other (secondary path(s)) may be used as backups (i.e. only when the primary one cannot be used, e.g. RLF).

In another particular embodiment of a NR-DC scenario, a priority may be set among the different cell groups or associated BAP identifiers, and the IAB node may try to send UL data over a lower priority cell group only when it was not able to send it via the high priority one (e.g. after trying for a configurable duration or number of times).

Certain of the above-described embodiments can be configured on a UE bearer level or per all packets regardless of to which UE/bearer the packet belongs to. In case of common handling for all bearers, the buffer threshold approach may be used, and the threshold may be compared with the total buffered UL data for all bearers.

According to certain embodiments, some bearers may be handled differently than others. For example, the default handling could be reflective routing while some bearers can be configured for split bearer like approach with primary path and buffer thresholds for path switching. Other aspects of NR-DC can also be readily utilized. For example, duplication via multiple paths/cell groups.

Figure 7:
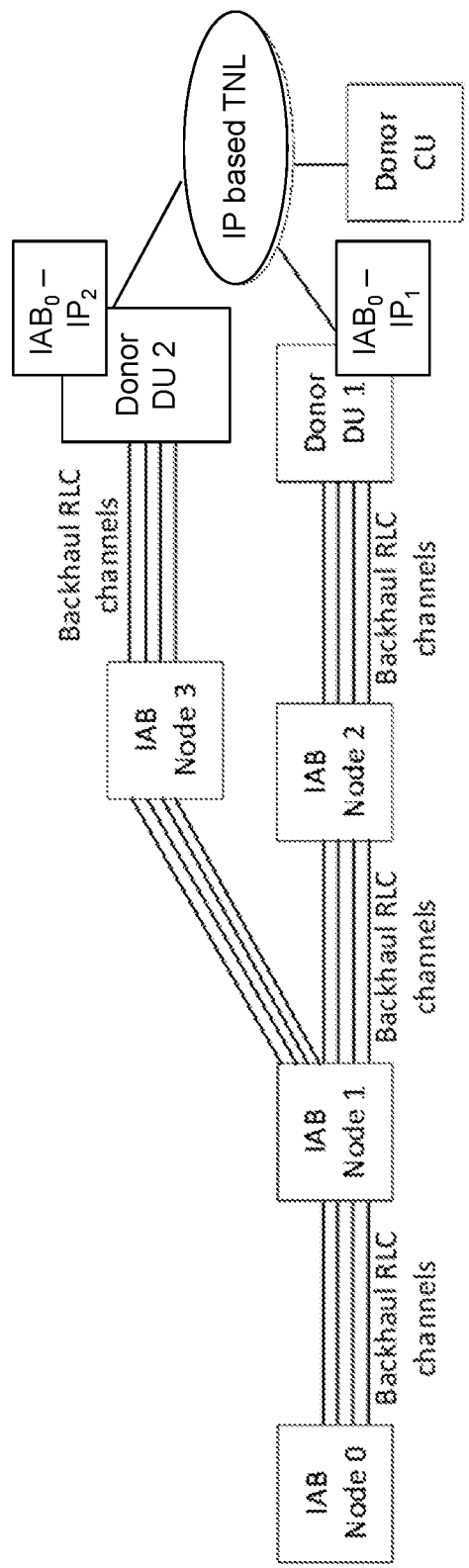
FIG. 7 illustrates multiple connectivity at intermediate nodes, leading to multiple connectivity of end nodes.

As discussed above, an IAB node that is connected to only one parent can still have multiple paths associated with it. One such example is IAB0 illustrated in FIG. 7. In this case, the MT will have only one cell group configurations. Thus, it should be possible to specify more than one BAP identifier for a single cell group. Also, on the embodiments described above associated with flexible routing via each path may also apply to this case as well.

According to certain embodiments, even in cases where an IAB node has only one parent, the MT BAP configuration may contain multiple BAP identifiers (i.e. more than one identifier associated with one cell group).

According to certain embodiments, the initial MT BAP configuration may contain a one to many associations between one cell group and multiple BAP identifiers.

According to certain embodiments, all the flexible routing approaches for the IAB node that has DC connectivity to more than one parent are also applicable to an IAB node that has single connectivity to a parent but has multiple path due to an intermediate node (between the IAB node and the donor) that has multiple connectivity.

If the IAB node can initially be accessed only via one path, but additional paths are added later on (either itself being configured with multiple connectivity, e.g. DC, or an intermediate node gets configured with multiple connectivity), the additional/removal of these paths/identifiers can be configured via subsequent MT BAP configurations.

According to certain embodiments, the IAB node may be configured with additional BAP identifiers in subsequent RRC Reconfiguration messages such as, for example, when a new path is established.

According to certain embodiments, the IAB node may be configured to remove an existing BAP identifier in subsequent RRC Reconfiguration messages such as, for example, when an existing path is released, when DC is released between the IAB node and its parent or by any of the intermediate IAB nodes.

After completing the initial configuration for the adaptation layer of the MT stack, the next step is to setup/configure the DU part of the IAB node. This is performed via the F1-AP setup request procedure. If only one BH RLC channel is setup as part of the MT setup, then such a mapping information is not required as it is implicitly clear which BH RLC channel is used for sending the UL F1 setup request message. If more than one BH RLC channel are setup, then there is a need to communicate the mapping information of (at least) non-UE-associated F1-AP messages to BH RLC channels. Making it possible to configure the UL mapping seems to be the more flexible option.

According to certain embodiments, the initial MT BAP configuration may contain a bearer mapping information (of at least the mapping of non-UE-associated F1-AP signalling to BH RLC channels). It may be for future study to determine exactly what information is used for this mapping (e.g. DSCP).

The intermediate IAB node and donor DU may be configured. Adopting the CU-DU principles, using RRC Reconfiguration to set up the MT BAP layer and the BH RLC channels between the IAB node and its parent node implies that F1-AP signalling is required between the donor CU and the parent IAB node.

According to certain embodiments, the F1-AP UE context setup procedure is employed between the donor CU and parent node (IAB node or donor DU) as part of the MT setup procedure.

The DU BAP of an IAB node is employed only when the IAB node has child nodes. Thus, when the first child IAB node gets connected to the network via the IAB node, there is a need to setup the DU BAP entity.

According to certain embodiments, the DU BAP is setup when a node (IAB node or donor DU) becomes a parent node for the first time.

Since the F1-AP UE context setup procedure is needed anyways to setup the child IAB node's context at the parent node, the F1-AP UE context setup procedure can be further enhanced to include the DU BAP configuration.

According to certain embodiments, the F1-AP UE context setup procedure could include the DU BAP configuration of the parent IAB node.

As described above, for DL traffic, an IAB node's DU BAP determines which route a packet has to be forwarded to and which BH RLC channel within that route will be used for forwarding the packet downstream. Thus, the IAB node may need to know the address of its child IAB nodes.

According to certain embodiments, the DU BAP configuration of a parent IAB node contains the child IAB node's BAP identifier(s).

In case the parent node is Donor DU the DU BAP configuration of the Donor DU may contain a bearer mapping information i.e. DSCP/flow labels to LCID, in a particular embodiment.

If the parent node is an IAB node the bearer mapping could be implicit from the LCID of the ingress bearer to BH RLC channels, in a particular embodiment.

Figure 11:
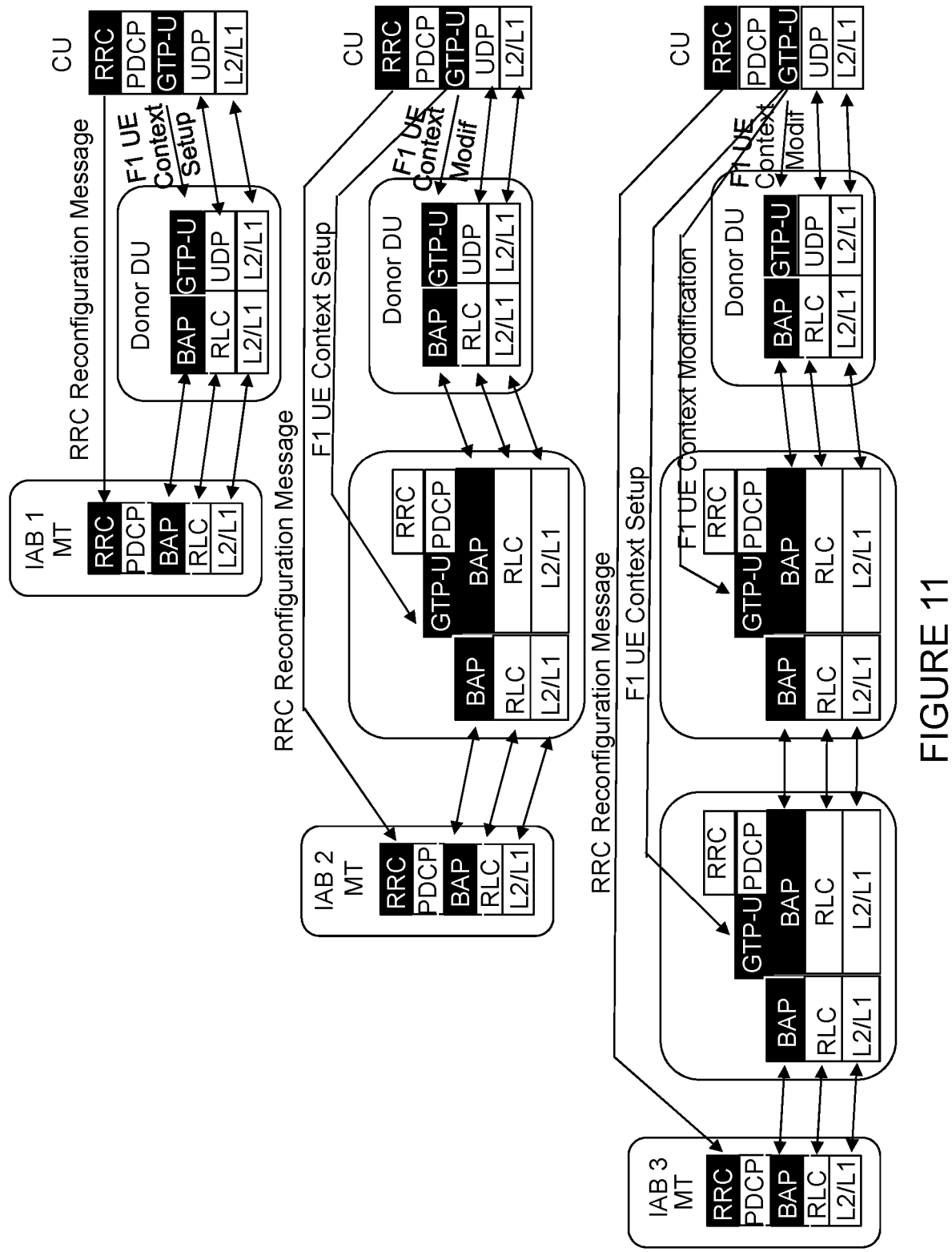
FIG. 11 illustrates IAB integration and associated RRC/F1 procedures.

If multiple hops are involved, it may be necessary to add/modify the BH RLC channels at the intermediate hops and update the routing/mapping information at the DU/MT BAP layers of the intermediate nodes. FIG. 11 illustrates IAB integration and associated RRC/F1 procedures. It should be noted that the RRC Reconfiguration messages may be encapsulated within the F1 UE context setup messages. They are shown separately in FIG. 11 for illustrative purposes.

For the three-hop scenario shown in FIG. 11, when IAB3 gets connected:

An F1 UE context modification message is sent to the donor DU, which contains DU BAP configuration for donor DU (e.g. routing information for packets destined to IAB3)
  and containing an RRC Reconfiguration message to reconfigure the MT BAP of IAB1 and optionally setup/reconfigure BH RLC channels between donor DU and IAB1
An F1 UE context modification message is sent to IAB1, which contains DU BAP configuration for IAB1 (e.g. routing information for packets destined to IAB3)
  and containing an RRC Reconfiguration message to reconfigure the MT BAP of IAB2 and optionally setup/reconfigure BH RLC channels between IAB1 and IAB2
As discussed above, an F1 UE setup message is sent to IAB2, which contains DU BAP configuration for IAB2 (e.g. routing information for packets destined to IAB3)
  and an RRC Reconfiguration message for setting up BH RLC channels between IAB2 and IAB3 and the routing/mapping information at MT BAP of IAB3

According to certain embodiments, the F1-AP UE context modification procedure employed between the donor CU and intermediate nodes between the parent IAB node and the donor DU to update the DU BAP configuration of these nodes (e.g. routing information of packets destined for the new IAB node).

According to certain embodiments, the F1-AP UE context modification procedure to include an RRC Reconfiguration message to reconfigure the BH RLC channels between intermediate IAB nodes and update corresponding MT BAP entities.

The example embodiment below illustrates an option where the BAP configuration is added to RRC Reconfiguration message. The changes are underlined. In the example embodiment, the configuration is not Cell Groups specific so the forwarding table in the BAP configuration contains the mapping between the BAP identifiers and the Cell Groups.

```
RRCReconfiguration ::=              SEQUENCE {
    rrc-TransactionIdentifier           RRC-TransactionIdentifier,
    criticalExtensions                  CHOICE {
        rrcReconfiguration                  RRCReconfiguration-IEs,
        criticalExtensionsFuture            SEQUENCE { }
    }
}
RRCReconfiguration-IEs ::=          SEQUENCE {
    radioBearerConfig                       RadioBearerConfig
        OPTIONAL, -- Need M
    secondaryCellGroup                  OCTET STRING (CONTAINING
```

```
CellGroupConfig)                          OPTIONAL, -- Need M
    measConfig                                        MeasConfig
OPTIONAL, -- Need M
    lateNonCriticalExtension                          OCTET STRING
OPTIONAL,
    nonCriticalExtension                              RRCReconfiguration-v1530-
IEs                                       OPTIONAL
}
RRCReconfiguration-v1530-IEs : :=         SEQUENCE {
    masterCellGroup                                   OCTET STRING (CONTAINING
CellGroupConfig)                          OPTIONAL, -- Need M
    fullConfig                                        ENUMERATED {true}
OPTIONAL, -- Cond FullConfig
    dedicatedNAS-MessageList              SEQUENCE (SIZE(1 . . maxDRB) )
OF DedicatedNAS-Message                   OPTIONAL, -- Cond nonHO
    masterKeyUpdate                                   MasterKeyUpdate
OPTIONAL, -- Cond MasterKeyChange
    dedicatedSIB1-Delivery                            OCTET STRING (CONTAINING
SIB1)                                     OPTIONAL, -- Need N
    dedicatedSystemInformationDelivery                OCTET STRING (CONTAINING
SystemInformation)                        OPTIONAL, -- Need N
    otherConfig                                       OtherConfig
OPTIONAL, -- Need M
    nonCriticalExtension                              RRCReconfiguration-v1540-
IEs                                       OPTIONAL
}
RRCReconfiguration-v1540-IEs : : =        SEQUENCE {
    otherConfig-v1540                                 OtherConfig-v1540
OPTIONAL, -- Need M
    nonCriticalExtension                              RRCReconfiguration-v15xy-
IEs         OPTIONAL
}
RRCReconfiguration-v15xy-IEs : :=         SEQUENCE {
    mrdc-SecondaryCellGroupConfig                     SetupRelease { MRDC-
SecondaryCellGroupConfig }                OPTIONAL, -- Need M
    radioBearerConfig2                                OCTET STRING (CONTAINING
RadioBearerConfig)                        OPTIONAL, -- Need M
    sk-Counter                                        SK-Counter
OPTIONAL , -- Need N
    nonCriticalExtension                                       RRCReconfiguration-
v16xy-IEs                                                  OPTIONAL
}
MRDC-SecondaryCellGroupConfig : :=        SEQUENCE {
    mrdc-ReleaseAndAdd                                ENUMERATED {true}
OPTIONAL, -- Need N
    mrdc-SecondaryCellGroup                           CHOICE {
        nr-SCG                                        OCTET STRING (CONTAINING
RRCReconfiguration),
        eutra-SCG                                     OCTET STRING
    }
}
MasterKeyUpdate : :=                      SEQUENCE {
    keySetChangeIndicator                             BOOLEAN,
    nextHopChainingCount                              NextHopChainingCount,
    nas-Container                                     OCTET STRING
OPTIONAL, -- Cond securityNASC
    . . .
}
RRCReconfiguration-v16xy-IEs : :=         SEQUENCE {
    mtBAPConfig                           BAPConfig          OPTIONAL,
    nonCriticalExtension                  SEQUENCE { }       OPTIONAL
}
BAPConfig : : = SEQUENCE {
    List-BAP-identifer                                SEQUENCE (SIZE(1 . . maxBAP-identifer) )
OF BAP-identifer
}
BAP-identifer : : = SEQUENCE {
    bAP-identifer                         INTEGER (1 . . 256),
    cell-group                            ENUMERATED {MCG, SCG}
}
```

According to other embodiments, rather than signalling this in the RRC Reconfiguration message (from CU to IAB node) directly, it may be signaled as part of the Cell Group(s), which is part of the RRC Reconfiguration message. In this way, there is no explicit need to signal the mapping between the BAP-identifier and Cell Group.

The CellGroupConfig IE is used to configure a master cell group (MCG) or secondary cell group (SCG). A cell group comprises of one MAC entity, a set of logical channels with associated RLC entities and of a primary cell (SpCel) and one or more secondary cells (SCells). An example modified CellGroupConfig IE element is shown below with proposed example changes being shown with underlining:

| CellGroupConfig information element |
|---|

```
-- ASN1START
-- TAG-CELLGROUPCONFIG-START
-- Configuration of one Cell-Group:
CellGroupConfig ::=                 SEQUENCE {
    cellGroupId                     ,
    rlc-BearerToAddModList          SEQUENCE (SIZE(1 . . maxLC-
ID) ) OF RLC-BearerConfig           OPTIONAL, -- Need N
    rlc-BearerToReleaseList         SEQUENCE (SIZE(1 . . maxLC-
ID) ) OF LogicalChannelIdentity     OPTIONAL, -- Need N
    mac-CellGroupConfig
OPTIONAL, -- Need M
    physicalCellGroupConfig
OPTIONAL, -- Need M
    spCellConfig
OPTIONAL, -- Need M
    sCellToAddModList                       SEQUENCE (SIZE
(1 . . maxNrofSCells) ) OF SCellConfig      OPTIONAL, -- Need N
    sCellToReleaseList                      SEQUENCE (SIZE
(1 . . maxNrofSCells) ) OF SCellIndex       OPTIONAL, -- Need N
    . . . ,
    [ [
    reportUplinkTxDirectCurrent-v1530       ENUMERATED {true}
OPTIONAL -- Cond BWP-Reconfig
    ]],
    List-BAP-identifer              SEQUENCE (SIZE(1 . . maxBAP-identifer) )
OF BAP-identifer,
    defaultIABCellGroup                     ENUMERATED {true} OPTIONAL,
    cellGroupPriority                       ENUMERATED {high, low OPTIONAL,
    threshold                               ENUMERATED {10 kbps, 100 kbps, 1 mbps,
10 mbps, 100 mbps, 1 Gbps, ...}
}
}
}
BAP-identifer ::= SEQUENCE {
    bAP-identifer       INTEGER (1 . . 256),
}
-- Serving cell specific MAC and PHY parameters for a SpCell:
SpCellConfig ::=                    SEQUENCE {
    servCellIndex
OPTIONAL, -- Cond SCG
    reconfigurationWithSync
OPTIONAL, -- Cond ReconfWithSync
    rlf-TimersAndConstants                  SetupRelease { RLF-
TimersAndConstants }        OPTIONAL, -- Need M
    rlmInSyncOutOfSyncThreshold             ENUMERATED {n1}
OPTIONAL, -- Need S
    spCellConfigDedicated                   ServingCellConfig
OPTIONAL, -- Need M
    . . .
}
ReconfigurationWithSync ::=     SEQUENCE {
    spCellConfigCommon                      ServingCellConfigCommon
OPTIONAL, -- Need M
    newUE-Identity                  RNTI-Value,
    t304                            ENUMERATED {ms50, ms100, ms150,
ms200, ms500, ms1000, ms2000, ms10000},
    rach-ConfigDedicated            CHOICE {
        uplink                      RACH-ConfigDedicated,
        supplementaryUplink         RACH-ConfigDedicated
    }
OPTIONAL, -- Need N
    . . . ,
    [ [
    smtc                                            SSB-MTC
OPTIONAL -- Need S
    ] ]
}
SCellConfig ::=                 SEQUENCE {
    sCellIndex                      SCellIndex,
    sCellConfigCommon                       ServingCellConfigCommon
OPTIONAL, -- Cond SCellAdd
    sCellConfigDedicated                    ServingCellConfig
OPTIONAL, -- Cond SCellAddMod
    . . . ,
    [ [
    smtc                                            SSB-MTC
```

| CellGroupConfig information element |
|---|
| OPTIONAL -- Need S<br>    ] ]<br>}<br>-- TAG-CELLGROUPCONFIG-STOP<br>-- ASN1STOP |

In the modified CellGroupConfig IE element shown above, in addition to the cell group, other information related to the routing is signaled. The other information may include information such as the default cell group for non-configured BAP identifiers, as well as thresholds or other load balancing related information.

Additionally, in the example above, if the defaultlABCellGroup=TRUE, this indicates that this cell group is to be associated with all traffic that are not explicitly mapped to a particular cell group.

The message coding in the example above should be seen as example coding and alternative coding elements with similar purpose are not excluded.

In the above description, the terms "setup" and "configure" are used interchangeably, and the terms "backhaul RLC channel" and "backhaul RLC bearer" are used interchangeably.

Figure 12:
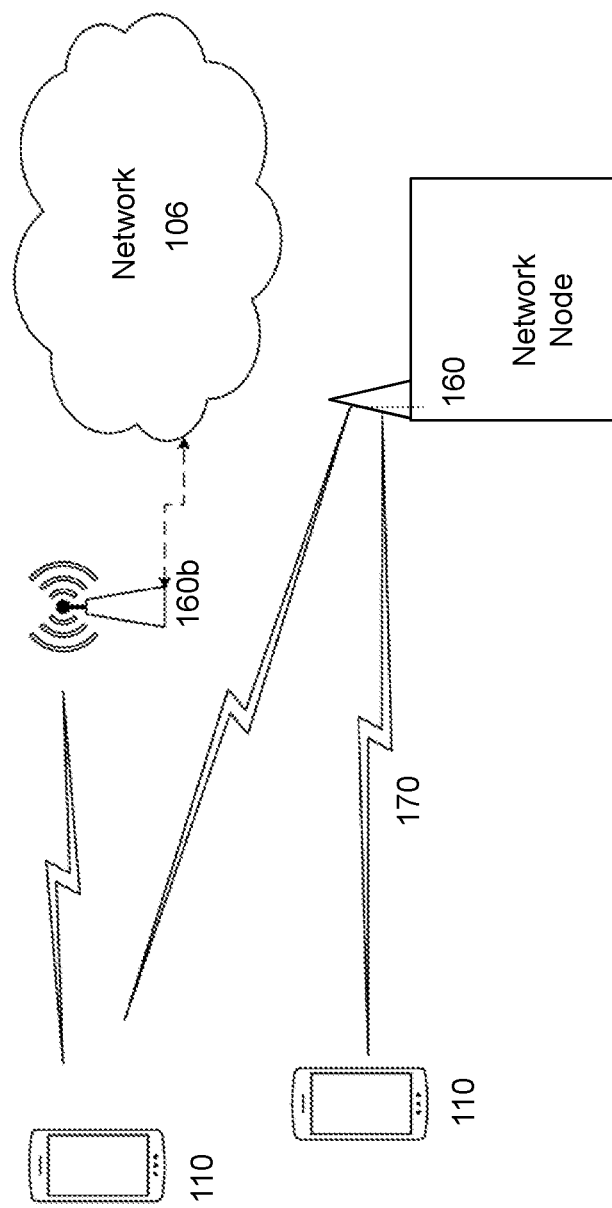
FIG. 12 illustrates an example wireless network, according to certain embodiments.

Although the subject matter described herein may be implemented in any appropriate type of system using any suitable components, the embodiments disclosed herein are described in relation to a wireless network. FIG. 12 illustrates an example wireless network. For simplicity, the wireless network of FIG. 12 only depicts network 106, network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 13:
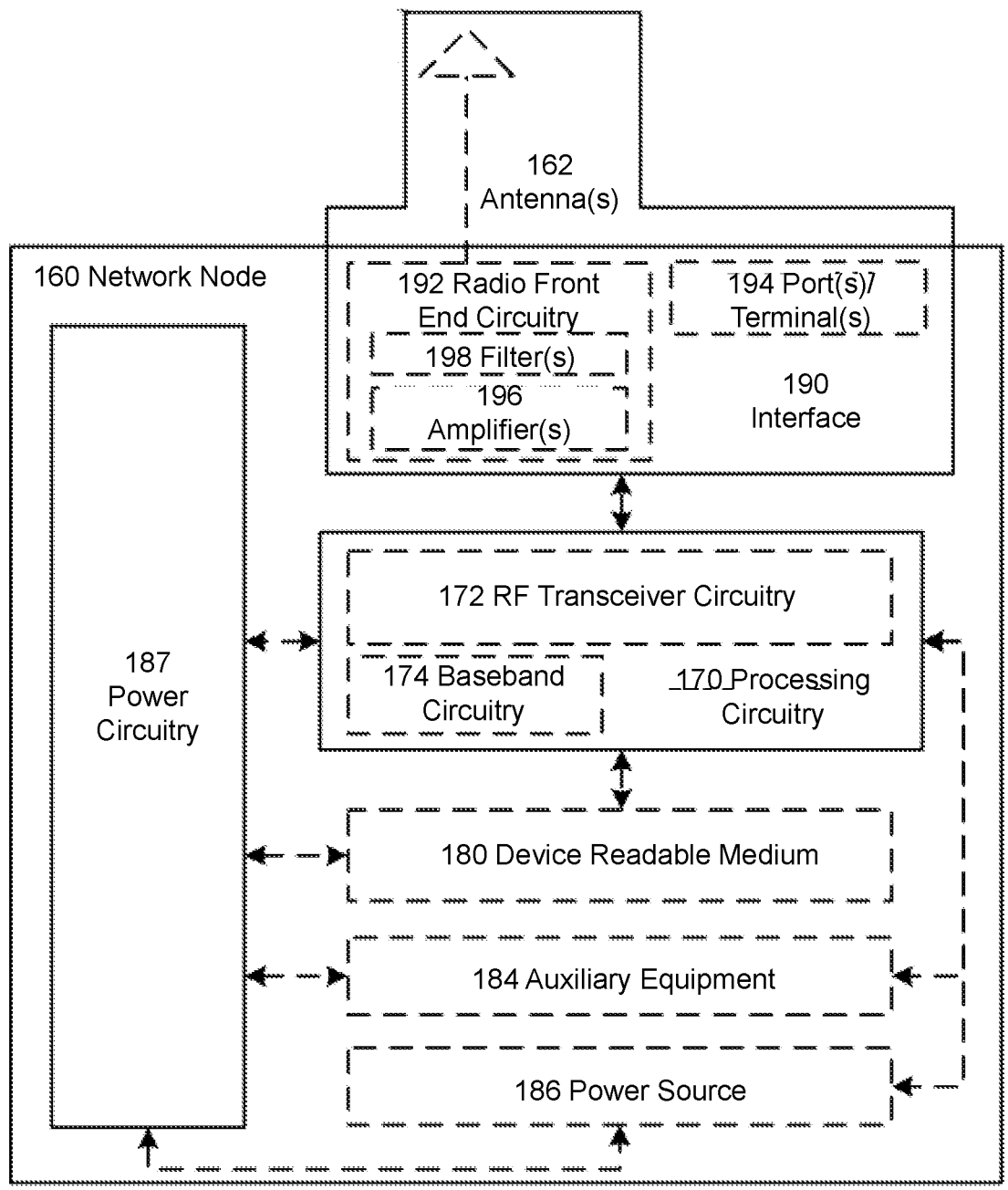
FIG. 13 illustrates an example network node, according to certain embodiments.

FIG. 13 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entity (MMEs)), Operation and Maintenance (O&M) nodes, Operations Support System (OSS) nodes, SON nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 13 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 14:
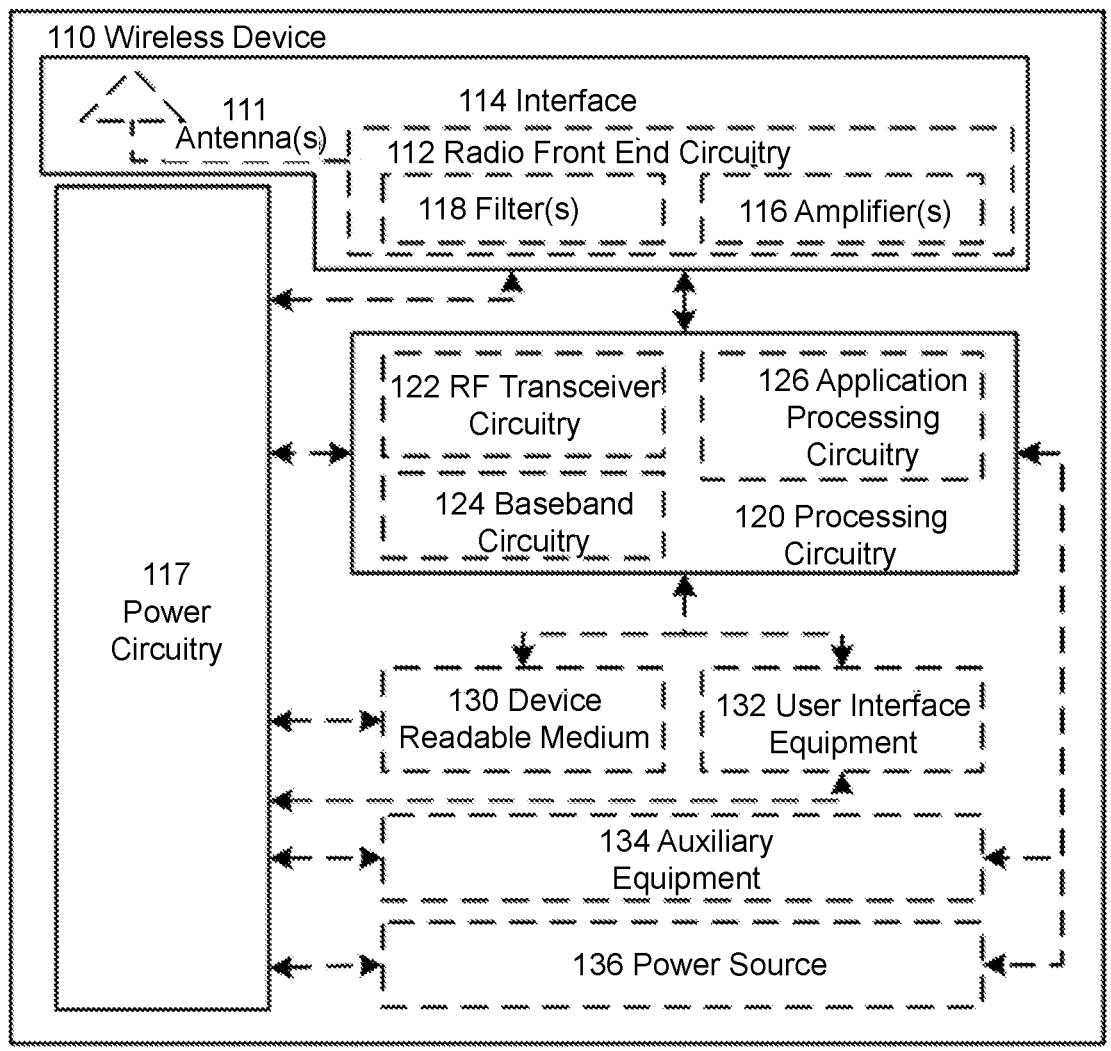
FIG. 14 illustrates an example wireless device, according to certain embodiments.

FIG. 14 illustrates a WD 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 15:
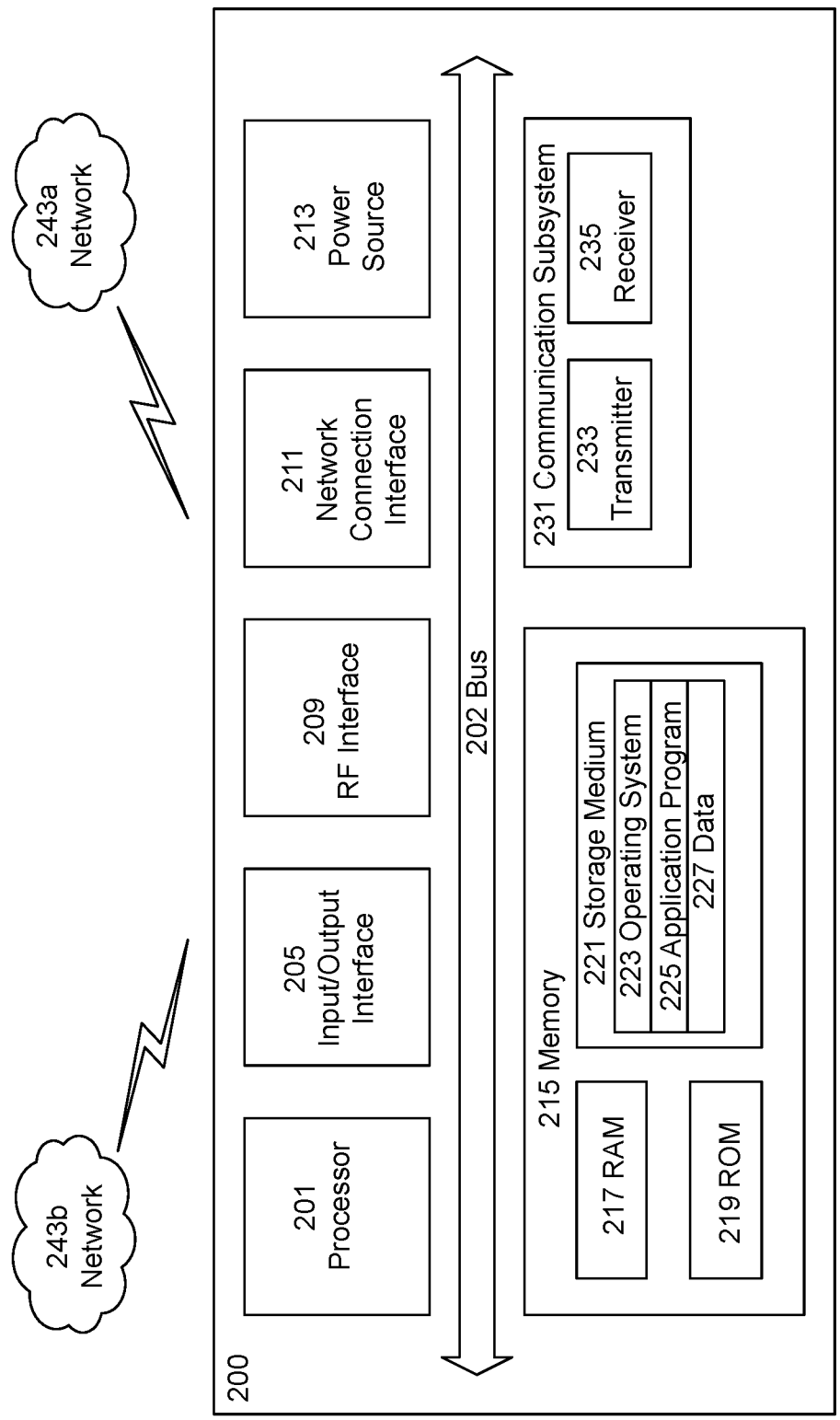
FIG. 15 illustrate an example user equipment, according to certain embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 15, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, Universal Terrestrial Radio Access Network (U IRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 16:
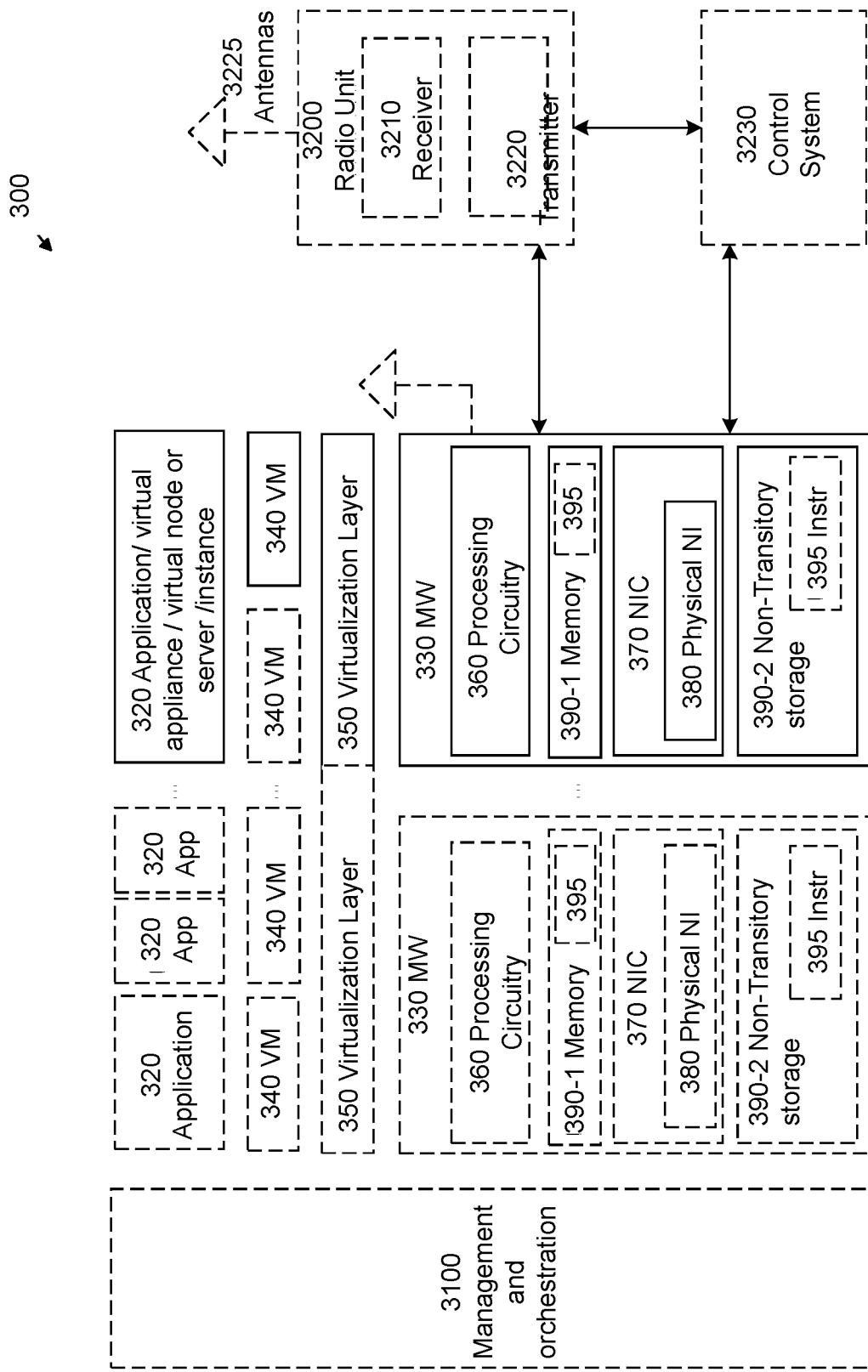
FIG. 16 illustrates a virtualization environment in which functions implemented by some embodiments may be virtualized, according to certain embodiments.

FIG. 16 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 16, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 16.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 17:
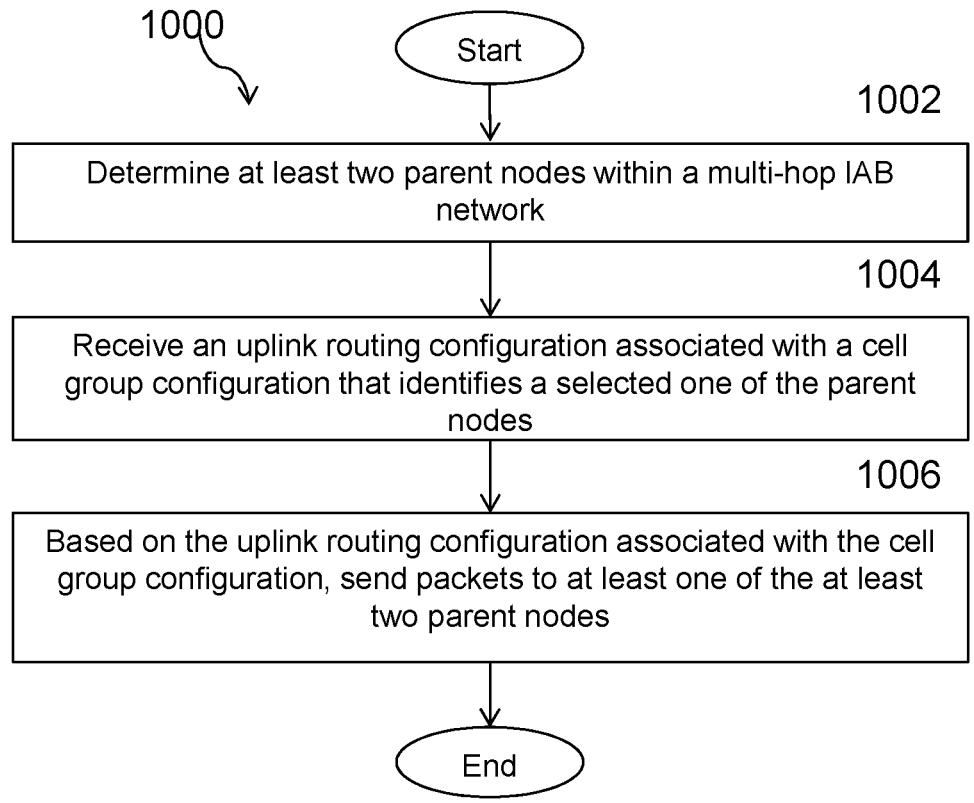
FIG. 17 illustrates an example method by a network node operating as an IAB node, according to certain embodiments.

FIG. 17 depicts a method 1000 by an IAB node, according to certain embodiments. At step 1002, the IAB node determines at least two parent nodes within a multi-hop IAB network. At step 1004, the IAB node receives an uplink routing configuration associated with a cell group configuration that identifies a selected one of the parent nodes. Based on the uplink routing configuration associated with the cell group configuration, the IAB node sends packets to at least one of the at least two parent nodes, at step 1006.

In a particular embodiment, the IAB node may include a network node such as network node 160.

In a particular embodiment, the IAB node configures lower layers of a link to the at least one of the two parent nodes.

In a particular embodiment, the packets to the at least one of the at least two parent nodes do not include an explicit next hop link identifier.

In a particular embodiment, the at least two parent nodes are determined based on a BAP identifier associated with the cell group configuration.

In a particular embodiment, the BAP identifier comprises at least one of: a target address, a source address, and a path identifier.

In a particular embodiment, sending the packets to the at least one of the at least two parent nodes includes routing the packets based on the BAP identifier in a packet header to the at least one of the at least one parent nodes associated with the cell group configuration.

In a particular embodiment, the cell group configuration is associated with a default cell group to which all traffic should be sent.

In a particular embodiment, the default cell group is hard-coded according to a standard.

In a particular embodiment, the default cell group is signaled to the IAB node using RRC signaling.

In a particular embodiment, the IAB node configures one or more load balancing parameters associated with the cell group configuration.

In a particular embodiment, the one or more load balancing parameters comprise thresholds for when a link to a corresponding one of the at least two parent nodes is preferred over another link to another one of the at least two parent nodes.

In a particular embodiment, the one or more load balancing parameters comprise weights associated with each link between the IAB node and the at least two parent nodes and the weights are used for prioritizing the links.

In a particular embodiment, each of the at least two parent nodes are associated with a respective one of a plurality of routes within the multi-hop IAB network.

In a particular embodiment, the at least two parent nodes are associated with a route within the multi-hop IAB network.

Figure 18:
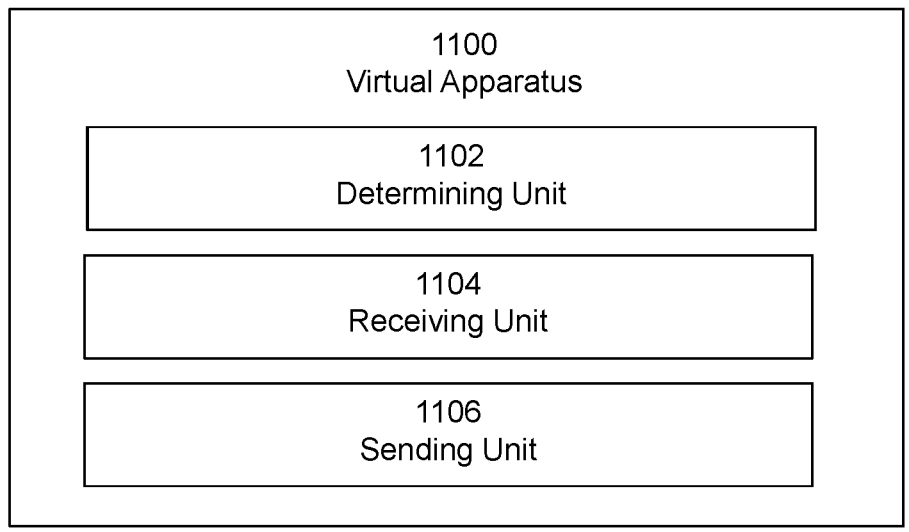
FIG. 18 illustrates another exemplary virtual computing device, according to certain embodiments.

FIG. 18 illustrates a schematic block diagram of a virtual apparatus 1100 in a wireless network (for example, the wireless network shown in FIG. 12). The apparatus may be implemented in a wireless device or network node (e.g., wireless device 110 or network node 160 shown in FIG. 12). Apparatus 1100 is operable to carry out the example method described with reference to FIG. 17 and possibly any other processes or methods disclosed herein. It is also to be understood that the method of FIG. 17 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1102, receiving unit 1104, sending unit 1106, and any other suitable units of apparatus 1100 to perform corresponding functions according one or more embodiments of the present disclosure.

According to certain embodiments, determining unit 1102 may perform certain of the determining functions of the apparatus 1100. For example, determining unit 1102 may determine at least two parent nodes within a multi-hop IAB network.

According to certain embodiments, receiving unit 1104 may perform certain of the receiving functions of the apparatus 1100. For example, receiving unit 1104 may receive an uplink routing configuration associated with a cell group configuration that identifies a selected one of the parent nodes.

According to certain embodiments, sending unit 1106 may perform certain of the sending functions of the apparatus 1100. For example, sending unit 1106 may send packets to at least one of the at least two parent nodes based on the uplink routing configuration associated with the cell group configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Example Embodiment 1. A method performed by a wireless device, the method comprising: providing user data; and forwarding the user data to a host computer via the transmission to the base station.

Example Embodiment 2. A method performed by an Integrated Access Backhaul (IAB) node, the method comprising: determining one or more other IAB nodes within a multi-hop IAB network based on a cell group; and receiving packets from or sending packets to at least one of the one or more other IAB nodes.

Example Embodiment 3. The method of the previous embodiment, wherein one of the other IAB nodes comprises a parent node and the method further comprises: configuring uplink routing as part of cell group configuration information that is used to configure lower layers of each link to the parent node.

Example Embodiment 4. The method of the previous embodiment, wherein configuring the uplink routing comprises configuring one instance of cell group configuration information per link.

Example Embodiment 5. The method of any of the previous two embodiments, further comprising abstaining from sending an explicit next hop link identifier in the uplink.

Example Embodiment 6. The method of any of the previous embodiments, wherein the one or more other IAB nodes are determined based on a list of BAP identifiers associated with the cell group.

Example Embodiment 7. The method of the previous embodiment, wherein each BAP identifier comprises at least one of: a target address, a source address, and a path identifier.

Example Embodiment 8. The method of any of the previous two embodiments, further comprising: routing uplink packets based on the BAP identifier in a packet header to the parent node associated with the cell group.

Example Embodiment 9. The method of any of the previous embodiments, wherein the cell group corresponds to a default cell group to which all traffic associated with BAP identifiers that are not explicitly signaled should be sent.

Example Embodiment 10. The method of the previous embodiment, wherein the default cell group is hard-coded according to a standard.

Example Embodiment 11. The method of embodiment 9, wherein the default cell group is signaled to the IAB node using radio resource control (RRC) signaling.

Example Embodiment 12. The method of any of the previous embodiments, further comprising: configuring one or more load balancing parameters associated with the cell group.

Example Embodiment 13. The method of the previous embodiment, wherein the one or more load balancing parameters comprise thresholds for when one link should be preferred over another link.

Example Embodiment 14. The method of any of the previous two embodiments, wherein the one or more load balancing parameters comprise weights associated with each link and the weights are used for prioritizing the links.

Example Embodiment 15. The method of any of the previous embodiments, further comprising: obtaining user data; and forwarding the user data to a host computer or a wireless device.

Example Embodiment 16. A wireless device, the wireless device comprising: processing circuitry configured to perform any of the steps of Example Embodiment 1; and power supply circuitry configured to supply power to the wireless device.

Example Embodiment 17. A base station, the base station comprising: processing circuitry configured to perform any of the steps of Example Embodiments 2 to 15; power supply circuitry configured to supply power to the base station.

Example Embodiment 18. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of Example Embodiment 1; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 19. A computer program, the computer program comprising instructions which when executed on a computer perform any of the steps of Example Embodiment 1.

Example Embodiment 20. A computer program product comprising a computer program, the computer program comprising instructions which when executed on a computer perform any of the steps of Example Embodiment 1.

Example Embodiment 21. A non-transitory computer-readable storage medium or carrier comprising a computer program, the computer program comprising instructions which when executed on a computer perform any of the steps of Example Embodiment 1.

Example Embodiment 22. A computer program, the computer program comprising instructions which when executed on a computer perform any of the steps of Example Embodiments 2 to 15.

Example Embodiment 23. A computer program product comprising a computer program, the computer program comprising instructions which when executed on a computer perform any of the steps of Example Embodiments 2 to 15.

Example Embodiment 24. A non-transitory computer-readable storage medium or carrier comprising a computer program, the computer program comprising instructions which when executed on a computer perform any of the steps of Example Embodiments 2 to 15.

Example Embodiment 25. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of Example Embodiments 2 to 15.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method performed by a network node-operating as an Integrated Access Backhaul, IAB, node, the method comprising:
   determining at least two parent nodes within a multi-hop IAB network wherein the at least two parent nodes are determined based on a Backhaul Adaptation Protocol, BAP, identifier associated with a cell group configuration;
   receiving an uplink routing configuration associated with the cell group configuration that identifies a selected one of the parent nodes; and
   based on the uplink routing configuration associated with the cell group configuration, sending packets to at least one of the at least two parent nodes.

2. The method of claim 1, further comprising:
   configuring lower layers of a link to the at least one of the two parent nodes.

3. The method of claim 1, wherein the packets to the at least one of the at least two parent nodes do not include an explicit next hop link identifier.

4. The method of claim 1, wherein the BAP identifier comprises at least one of: a target address, a source address, and a path identifier.

5. The method of claim 3, wherein sending the packets to the at least one of the at least two parent nodes comprises:
   routing the packets based on the BAP identifier in a packet header to the at least one of the at least one parent nodes associated with the cell group configuration.

6. The method of claim 1, wherein the cell group configuration is associated with a default cell group to which all traffic should be sent.

7. The method of claim 6, wherein the default cell group is hard-coded according to a standard.

8. The method of claim 6, wherein the default cell group is signaled to the IAB node using radio resource control, RRC, signaling.

9. The method of claim 1, further comprising:
   configuring one or more load balancing parameters associated with the cell group configuration.

10. The method of claim 9, wherein the one or more load balancing parameters comprise thresholds for when a link to a corresponding one of the at least two parent nodes is preferred over another link to another one of the at least two parent nodes.

11. The method of claim 1, wherein the at least two parent nodes are associated with a route within the multi-hop IAB network.

12. A network node operating as an Integrated Access Backhaul, IAB, node, the network node comprising:
   processing circuitry configured to:
      determine at least two parent nodes within a multi-hop IAB network wherein the at least two parent nodes are determined based on a Backhaul Adaptation Protocol, BAP, identifier associated with a cell group configuration;
      receive an uplink routing configuration associated with the cell group configuration that identifies a selected one of the parent nodes; and
      based on the uplink routing configuration associated with the cell group configuration, send packets to at least one of the at least two parent nodes.

13. The network node of claim 12, wherein the processing circuitry is configured to configure lower layers of a link to the at least one of the two parent nodes.

14. The network node of claim 12, wherein the packets to the at least one of the at least two parent nodes do not include an explicit next hop link identifier.

15. The network node of claim 12, wherein the BAP identifier comprises at least one of: a target address, a source address, and a path identifier.

16. The network node of claim 12, wherein sending the packets to the at least one of the at least two parent nodes comprises:
   routing the packets based on the BAP identifier in a packet header to the at least one of the at least one parent nodes associated with the cell group configuration.

17. The network node of claim 16, wherein the cell group configuration is associated with a default cell group to which all traffic should be sent.

18. The network node of claim 17, wherein the default cell group is hard-coded according to a standard.

19. The network node of claim 17, wherein the default cell group is signaled to the IAB node using radio resource control, RRC, signaling.

20. The network node of claim 12, wherein the processing circuitry is configured to:
   configure one or more load balancing parameters associated with the cell group configuration.

21. The network node of claim 20, wherein the one or more load balancing parameters comprise thresholds for when a link to a corresponding one of the at least two parent nodes is preferred over another link to another one of the at least two parent nodes.

22. The network node of claim 12, wherein the at least two parent nodes are associated with a route within the multi-hop IAB network.

* * * * *